United States Patent
Tanaka et al.

(10) Patent No.: US 6,866,424 B2
(45) Date of Patent: Mar. 15, 2005

(54) OPTICAL CONNECTOR WITH SHUTTER

(75) Inventors: Yuwa Tanaka, Sakura (JP); Kunihiko Fujiwara, Sakura (JP); Takaaki Ishikawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 119 days.

(21) Appl. No.: 10/286,436

(22) Filed: Nov. 1, 2002

(65) Prior Publication Data

US 2004/0062486 A1 Apr. 1, 2004

(30) Foreign Application Priority Data

Oct. 1, 2002 (JP) .................................... P 2002-289222
Oct. 28, 2002 (JP) .................................... P 2002-313516

(51) Int. Cl.[7] ................................................ G02B 6/38
(52) U.S. Cl. ...................................................... 385/55
(58) Field of Search ............................. 385/55, 76–78

(56) References Cited

U.S. PATENT DOCUMENTS 6,688,780 B2 * 2/2004 Duran ........................ 385/76

* cited by examiner

Primary Examiner—Khiem Nguyen
(74) Attorney, Agent, or Firm—Hoffmann & Baron, LLP

(57) ABSTRACT

This optical connector with a shutter is for blocking emitted light from the connected optical connector, such as an optical connector adaptor, provided in a connector hole of a connector housing by using a shutter. In this optical connector with a shutter, the shutter unit is assembled in the center part of the connector housing, and the emitted light in the connector hole from the connected optical connector is blocked by shutter pieces of the shutter unit. Furthermore, an electromagnetic shielding capacity can be obtained without enlarging the optical connector by making the shutter unit from electrically conducting members.

38 Claims, 17 Drawing Sheets

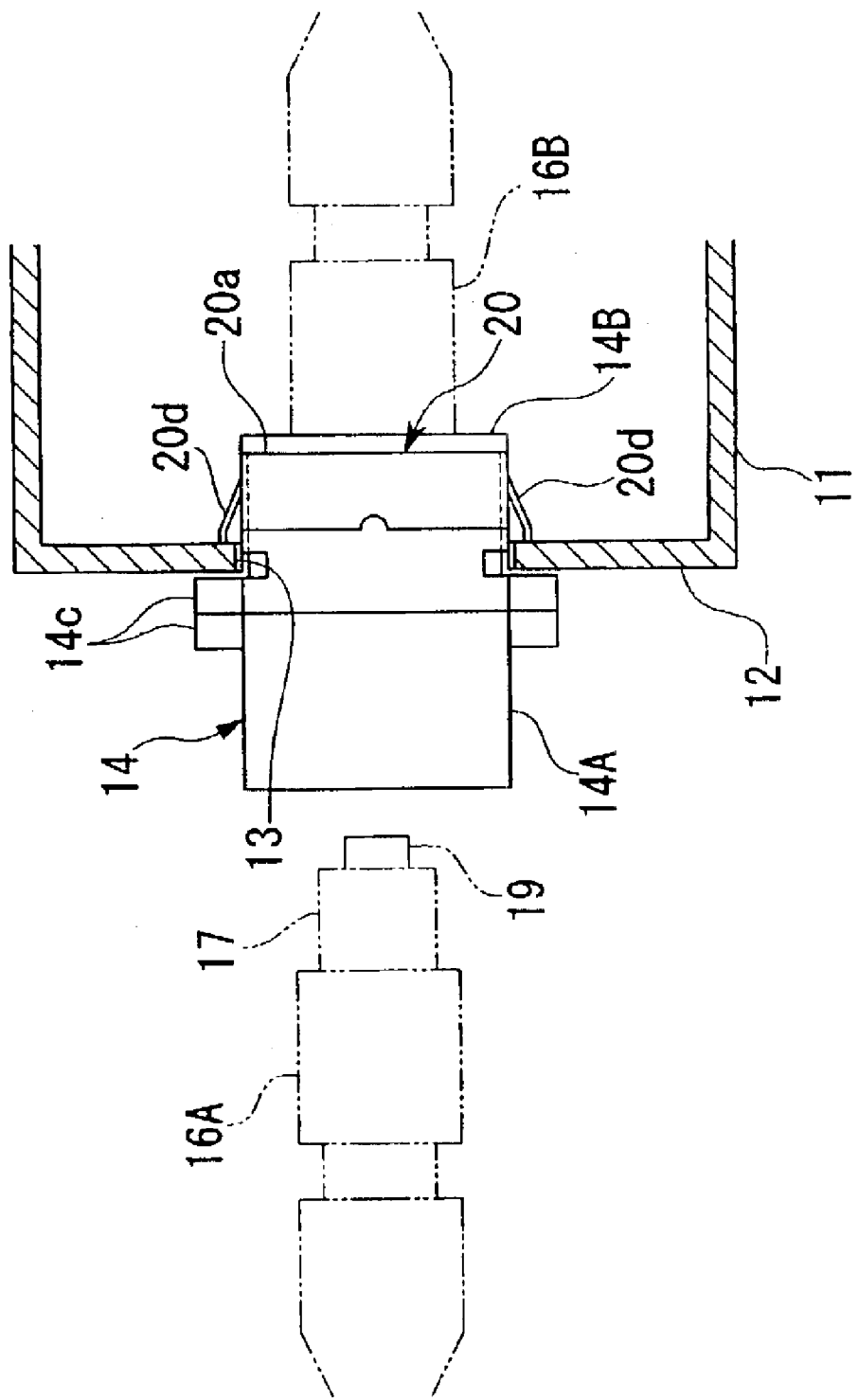

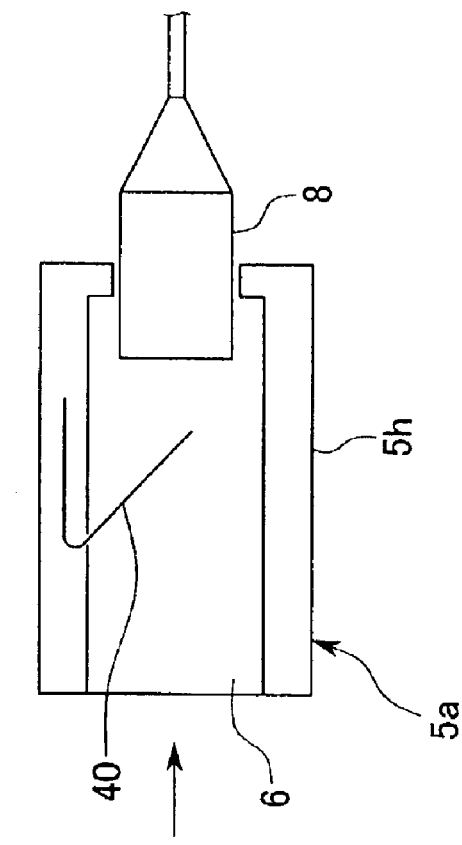
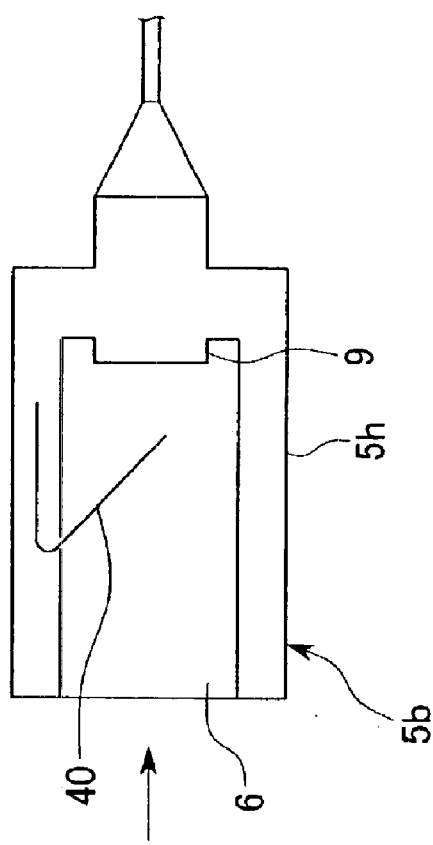
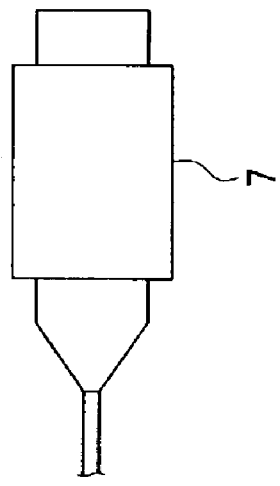
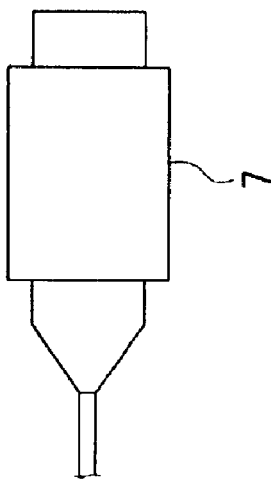
FIG. 16A
FIG. 16B

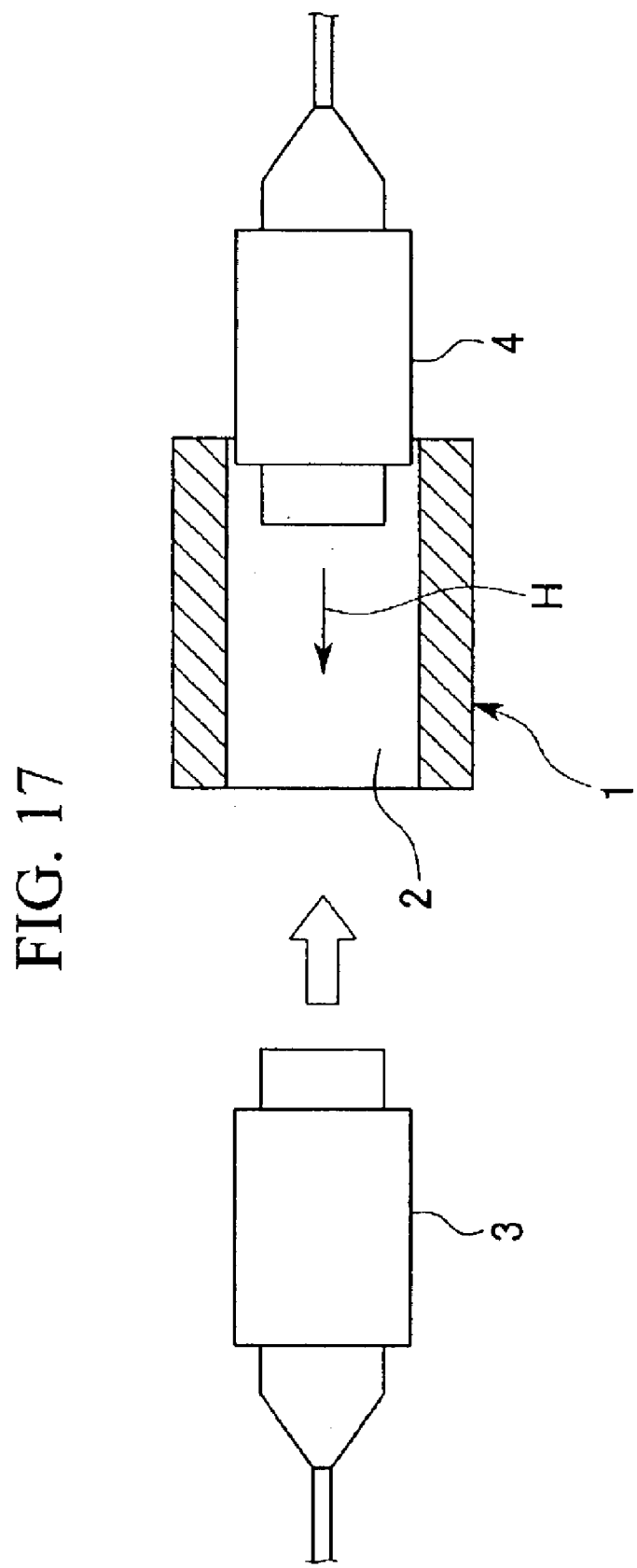

OPTICAL CONNECTOR WITH SHUTTER

BACKGROUND OF THE INVENTION

1. Field of the Invention

The present invention relates to an optical connector, and in particular to an optical connector with a shutter that blocks the emitted light from the connected optical connector and is provided in the connector housing into which the optical connector is inserted and connected.

2. Description of the Related Art

As shown in FIG. 17, for example, in the case that the optical connector 3 (optical connector plug) is inserted into the connector hole 2 of the optical connector adaptor 1 and connected to the optical connector 4 (optical connector plug; below referred to as the "adaptor side optical connector") that has been inserted from the opposite side and connected to the optical connector adaptor 1, it is necessary to prevent the emitted light H from the distal end of the adaptor side optical connector 4 from entering the eyes of the worker who is manipulating the optical connector 3 on the insertion side. The same requirement is present, for example, during the insertion into and connecting of the optical connectors for any type of connector housing such as an optical connector receptacle.

In order to satisfy this requirement, Japanese Unexamined Patent Application, First Publication, No. Hei 6-201953 and Japanese Unexamined Patent Application, First Publication, No. 2002-243978 propose attaching a lid that opens and closes the connector hole 2 in proximity to the opening of the connector hole 2 of the optical connector adaptor 1, thereby blocking the emitted light from the adaptor side optical connector 4.

However, there are the following problems related to the blocking by the lid described above:

1. Many require a manual opening and closing operation during insertion of the optical connector, and considerable labor is involved in this operation.

2. The structure for installing the optical connector so as to be freely opened and closed is complex, many are formed by a number of parts, and the cost becomes high. In addition, downsizing is difficult, and large-scale design changes and enlargement of the optical connector adaptor becomes necessary.

3. Because downsizing as described in 2 above is difficult, it cannot be applied to using multiple cores in the optical connector adaptor, increasing the density of the connector installation hole, or downsizing.

In addition, recently the electromagnetic wave shielding capacity in electronic instruments must be increased, the electronic parts in the casing must be protected so as not to be influenced by the external electromagnetic waves, and therefore the influence of electromagnetic waves on other electronic and electrical instruments must be stopped by preventing the radiation of electromagnetic waves from the instruments, the use of casings having an electromagnetic wave shielding capacity, such as an electrically conducting metal casing, is becoming more common. However, as shown in FIG. 18 to FIG. 20, to install an optical connector adaptor 1 in the installation wall 6 of the casing 5, it is necessary to form a large connector installation hole 7 that allows insertion of the optical connector adaptor 1 into the installation wall 6. In addition, plastic optical connector adaptors 1 are widely used, and when installing such a plastic optical connector adaptor 1 in the installation wall 6 by inserting it into the connector installation hole 7, even if the casing 5 has an electromagnetic wave shielding capacity, it becomes impossible to guarantee the electromagnetic wave shielding capacity of the connector installation hole 7. Although, for example, installing an electrically conducting cover on the outside of the optical connector adaptor 1 has been investigated, installing an electrically conducting cover that goes up to the opening of the connector hole 2 of the optical connector adaptor 1 is in fact impossible because the connection operability of the optical connector 3 with respect to the optical connector adaptor 1 cannot be guaranteed, and therefore, the electromagnetic wave shielding capacity of the connector installation hole 7 cannot be guaranteed. Thus, the development of technology that can effectively block the electromagnetic waves from the connector installation hole formed in the installation wall of the casing of the instrument is required.

Moreover, the problem related to this electromagnetic shield is also not limited to the optical connector adaptor, but occurs, for example, in the same way when a connector installation hole is formed in the installation wall in order to install any type of optical connector into which an optical connector plug is inserted and connected.

In consideration of the problems described above, it is an object of the present invention to provide an optical connector with a shutter that facilitates downsizing of the shutter for shielding and lowering of the cost, and furthermore, can guarantee the precision of the installation position and the installation stability of the optical connector, can realize downsizing and increased density (increased density of the connector installation hole) of the connector housing, and in addition, can easily realize the guarantee of the electromagnetic wave shielding capacity of the connector installation hole by installation in a connector installation hole formed in the installation wall of the casing of the instrument.

SUMMARY OF THE INVENTION

In the optical connector with a shutter of the present invention, a shutter unit that blocks emitted light from the connected optical connector is incorporated into the connector housing such that the optical connector and connected optical connector are connected inside a connector hole into which the optical connector is inserted and connected. The shutter unit comprises a body installed in proximity to the position of the connection between the optical connector in the connector hole and the connected optical connector, and tongue-shaped shutter pieces that project from the body into the connector hole and are disposed so as to be able to block the emitted light from the optical fiber exposed at the distal end of the connected optical connector. The shutter piece are pressed down so that the amount of the projection into the connector hole decreases due to being pressed by the optical connector that has been inserted into the connector hole, and as a result, it becomes possible to connect the optical connector to the connected optical connector. In addition, when the optical connector is extracted from the connector hole, the shutter piece is restored to a position that can block the emitted light from the connected optical connector due to its own elasticity or the urging force of an urging device provided in the shutter unit.

According to the optical connector with this shutter, it is possible to carry out effectively the connection operation of a separate optical connector with the connected optical connector because the emitted light from the connected optical connector is blocked by the shutter unit.

The shutter pieces have a shielding capacity that can block the emitted light from the connected optical connector, and extend from the body at an angle with respect to the axial direction of the connector hole (including an angle of inclination of 90°). Thereby, the shutter pieces are disposed inside the connector hole so as to make possible blocking the emitted light from the connected optical connector in the connector housing. However, it is not necessary to have a size that completely blocks the entire connector hole while this shutter piece is disposed at a position that blocks the emitted light from at least the connected optical connector.

The optical connector with this shutter can be applied to an optical connector having a connector hole into which an optical connector plug is inserted and connected, such as an optical connector adaptor into which optical connector plugs that are inserted and connected from both facing sides are connected together, or an optical connector receptacle that has a built-in optical connector (an optical connector ferrule and the like) optically connected to an optical connector plug by inserting the optical connector plug into the connector hole.

The connected optical connector denotes, in an optical connector adaptor (connector housing), the optical connector plug that is inserted into the connector hole before the insertion of the optical connector into the connector hole. This optical connector plug is connected with the optical connector in the connector hole by insertion of the optical connector into the connector hole. In addition, in an optical connector receptacle (connector housing), as shown in FIG. 16A and FIG. 16B, for example, the connected optical connector is the part that is incorporated into the housing 5h of the optical connector receptacles 5a and 5b, is disposed towards the interior of the connector hole 6 (the right side in FIG. 16A and FIG. 16B), and has connected thereto the optical connector 7, which has been inserted into the connector hole 6. In the optical connector receptacle 5a shown in FIG. 16A, the optical connector 8, which is separate from the housing 5h, is the connected optical connector, but this is not limiting, and like the optical connector receptacle 5b shown in FIG. 16B, a part 9, where a portion of the housing 5h is formed in the shape of a connector, can serve as the connected optical connector. In FIG. 16A and FIG. 16B, the illustration of the body of the shutter unit is omitted.

In this invention, the connector housing can be installed in a connector installation hole formed in the installation wall. In this case, a shielding plate is formed when the connector housing is installed in the body of the shutter unit so as to cross the connector hole and the contact housing is installed in the installation wall. This shielding plate is a conducting member and is disposed so as to block the connector installation hole almost entirely. In addition, a window is formed in the shielding plate that allows the insertion of the optical connector into the part corresponding to the connector hole, and when viewed from the opening of the connector hole, the shutter piece can be disposed so as to block this window.

In this structure, the shielding plate, which is the body of the shutter unit, functions as an electromagnetic wave shield member in order to guarantee the electromagnetic shielding capacity of the connector installation hole in the installation wall.

The electromagnetic wave shielding capacity can be effectively exhibited by making the shielding plate an electrically conducting member provided in the installation wall, or in the case that the installation wall itself is electrically conducting, electrically connecting the shielding plate to the installation wall itself as a ground. As a shielding plate having an electromagnetic wave shielding effect, it is possible to use various types of structures, such as ones formed from electrically conducting stainless steel metal plates, ones having an electrically conducting coating (such as a paste having mixed therein magnetic metal particles having an electromagnetic wave absorbing function) applied to the backing of, for example, a plate, or ones having a conducting fabric comprising an electrically conducting fiber (metal fiber, for example) fastened to the backing. In the case that electromagnetic wave shielding capacity is imparted to parts of the shutter unit other than the shielding plate, similar materials can be used.

In addition, the window formed in the shielding plate should have a size that allows insertion of the optical connector plug, and is preferably formed as small as possible in consideration of guaranteeing the electromagnetic wave shielding capacity of the connector installation hole. Thereby, the electromagnetic wave shielding capacity of the connector installation hole is effectively guaranteed because, except for the small portion corresponding to the window, the shielding plate is disposed so as to cover most of the connector installation hole. Like the optical connector plugs (MPO optical connector plugs) illustrated in FIG. 3 and FIG. 13, in the case of using an optical connector plug whose part (below, referred to as the insertion part; this is the housing 17 for the optical connection plug shown in FIG. 3 and FIG. 13) positioned forward of the insertion direction with respect to the connector housing of the optical connector adaptor has a cross-sectional shape formed so as to be smaller (narrower) than the other parts, the size of the window formed in the shielding plate can be reduced to a size that substantially conforms to the insertion part of the optical connector plug, and thereby these are advantageous in terms of guaranteeing the electromagnetic wave shielding capacity of the connector installation hole.

The electromagnetic wave shielding capacity of the connector installation hole can also be attained by using an electrically conducting member as the shutter piece. In consideration of guaranteeing the electromagnetic wave shielding capacity of the connector installation hole, when the shutter pieces are at the position where the light emitted from the connected optical connector is blocked (below, referred to as the shielding position), preferably the shutter pieces have a shape and dimensions that can cover the connector hole over as wide an area as possible. In addition, naturally the electromagnetic wave shielding capacity can be further increased by using this shutter piece and the above body together. Specifically, by using electrically conducting materials on more members that form the shutter unit, such as the shutter pieces, these members are made to function as electromagnetic wave shielding members. This is preferable in terms of guaranteeing the electromagnetic wave shielding capacity of the connector installation hole.

Moreover, in the case that the shutter piece covers substantially the entire connector hole when the shutter piece is at the shielding position, the shutter piece at the shielding position can also be made to function as a dust-proof shutter that prevents penetration of dust or the like into the space between the shutter piece and the connected optical connector.

Various methods can be used for incorporating the shutter unit into the connector housing. Examples of such methods are incorporation during the assembly of the connector housing, insertion and attachment from the outside, and being embedded in the molded resin of an optical connector made of a synthetic resin such as plastic.

In the present invention, a structure can be used in which the connector housing comprises two housing halves partitioned at the center in the axial direction of the connector hole, and the shutter unit is incorporated into the connector housing while being held between the two housing halves. In the case, for example, of an optical connector adaptor having a connector housing that is assembled by integrating the two housing halves, it is possible to use a structure in which the shutter unit is incorporated by being disposed between the two housing halves when integrating the two housing halves. In this case, it is possible to use a structure in which a recess for accommodating the shutter unit is formed in proximity to the joint between the two housing halves. In addition, by splitting the connector housing by separating it into two housing halves, a structure can be used wherein the shutter unit can be removed.

In addition, in the present invention, a structure can be used in which the shutter piece of the shutter unit communicates with the body so as to be able to rotate freely centered on an axis of rotation substantially perpendicular to the axial direction of the connector hole by a hinge. The urging device is a plate or pin shaped spring disposed so as to abut a position on the axis of rotation side offset more than the distal end of the shutter piece that extends from the hinge. This spring is elastically deformed by the rotation of the shutter piece that is pressed by the optical connector that has been inserted into the connector hole, and when the optical connector is extracted from the connector hole, the shutter piece is pressed by elastic restoration to return to the position allowing blocking of the emitted radiation.

As a shutter unit according to the present invention, it is possible to use one formed in its entirety by processing one metal plate, but as described above, it is also possible to make the shutter piece and the urging device separate members that communicate so as to rotate freely with respect to the body due to a hinge. Furthermore, as described above, in the case of a structure in which the spring that serves as the urging device abuts a position on the axis of rotation side offset more than the distal end of the shutter piece that extends from the hinge, the amount of displacement of the spring can be made small in comparison to the rotational displacement of the shutter piece. Therefore, in comparison to the case of forming the entire shutter unit, including the shutter piece, from one metal plate and the shutter piece that is pressed down by the optical connector that has been inserted into the connector hole being restored to a position that can block the emitted light from the connected optical connector due to the elasticity of the shutter itself during the removal of the optical connector from the connector hole, it is possible to limit the deterioration of the spring when repeating the connection and removal of the optical connector in the connector housing because the deformation of the spring is less than the deformation of the shutter piece. As a result, the durability of the spring is improved, and the reliability as an optical connector with a shutter can be maintained over a long period of time.

In addition, in the shutter unit, when a structure is used in which shutter pieces are disposed facing each other on both sides of the body, in the case of an optical adaptor or the like, in which optical connectors (optical connector plug) are inserted from both facing sides of the connector hole, among the optical connectors connected by insertion from both sides of the connector hole, the emitted light from the distal end of the connected optical connector can be blocked even when one serves as the connected optical connector. Furthermore, simply by incorporating one shutter unit into the connector housing, almost no (or no) enlargement and cost increase in the connector housing is incurred, and the shielding function can be exhibited in both optical connectors connected by insertion into the connector hole from both sides.

In addition, in this shutter unit, in the case that the shutter pieces are disposed facing each other on both sides of the body, a structure can be used in which the communication positions between each of the shutter pieces and the main body are positioned so as to face each other on both sides of the body, and are on both sides of the center axis of the connector hole of the connector housing. Each of the shutter pieces is provided so as to project into the connector hole from the communication position with the body.

BRIEF DESCRIPTION OF THE DRAWINGS

FIG. 2 is a cross sectional drawing showing the installed state of the optical connector with a shutter shown in FIG. 1A to FIG. 1D with respect to the installation wall of the casing, and shows the vicinity of the connector installation hole of the installation wall.

FIG. 16A is a cross-sectional drawing showing the optical connector receptacle adapting the optical connector with a shutter according to the present invention, and shows the case in which the connector housing is integrally formed with the connected optical connector.

FIG. 16B is a cross-sectional drawing showing the optical connector receptacle adapting the optical connector with a shutter according to the present invention, and shows the case in which the connector housing is integrally formed with the connected optical connector.

FIG. 17 is a cross-sectional drawing showing a connection between optical connector plugs through the optical connector adaptor.

DETAILED DESCRIPTION OF THE PREFERRED EMBODIMENT

Figure 1A:
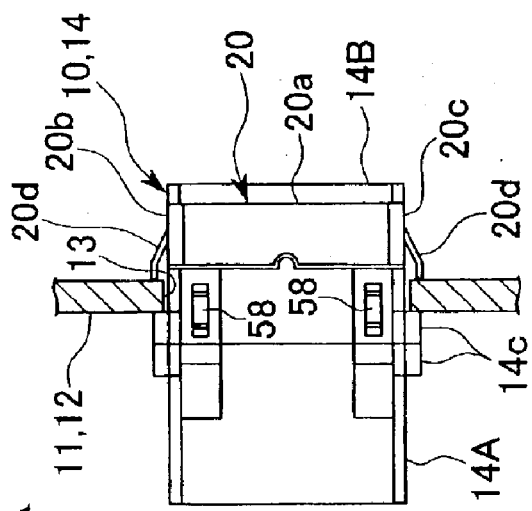
FIG. 1A is a planar drawing showing an example of the structure of the optical connector with a shutter of the present invention.
Figure 1D:
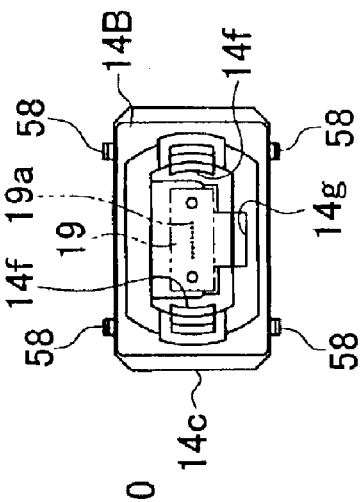
FIG. 1D is a drawing showing an example of the structure of the optical connector with a shutter of the present invention from the right side.
Figure 1C:
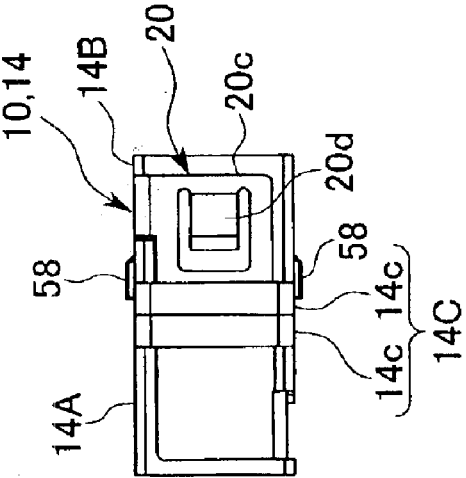
FIG. 1C is a frontal drawing showing an example of the structure of the optical connector with a shutter of the present invention.
Figure 1B:
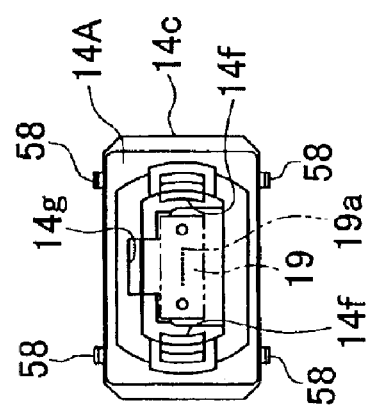
FIG. 1B is a drawing showing an example of the structure of the optical connector with a shutter of the present invention from the left side.
Figure 3:
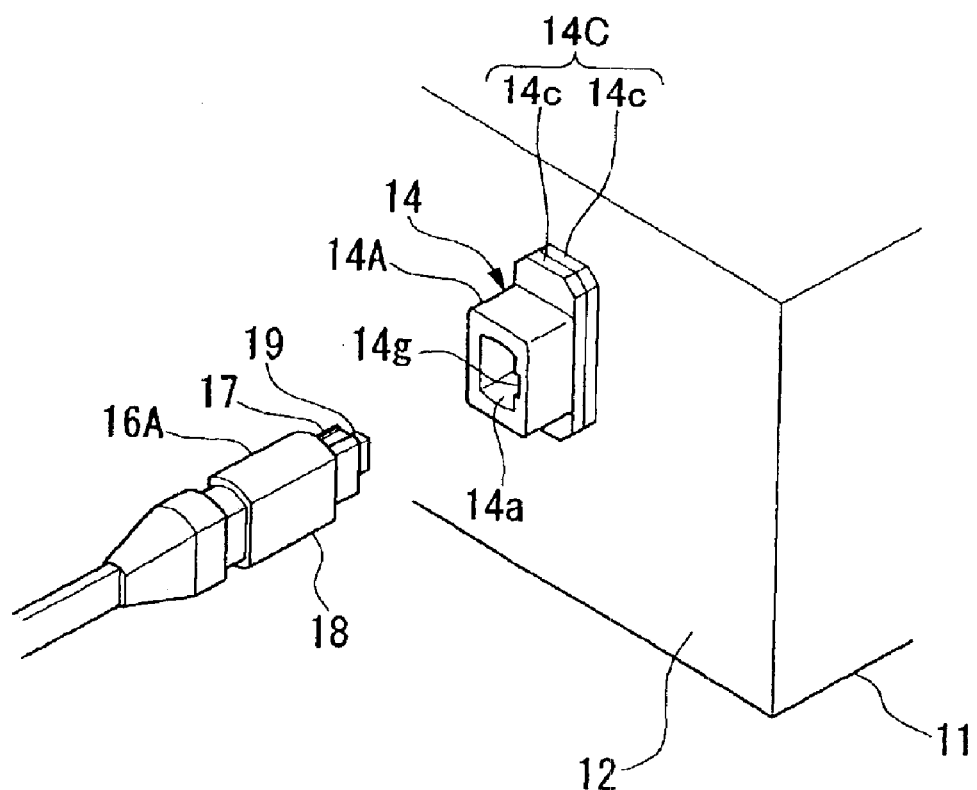
FIG. 3 is a perspective drawing viewing the installation state in FIG. 2 from the outside of the casing.
Figure 4:
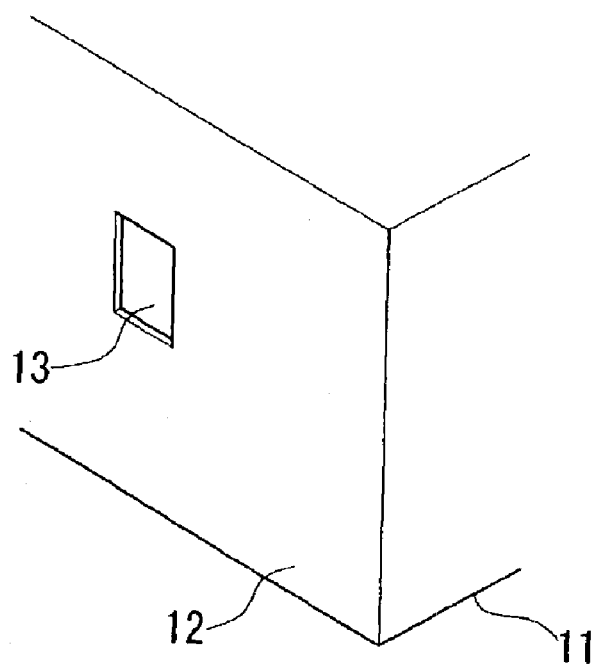
FIG. 4 is a perspective drawing showing the connector installation hole formed in the installation wall.
Figure 5:
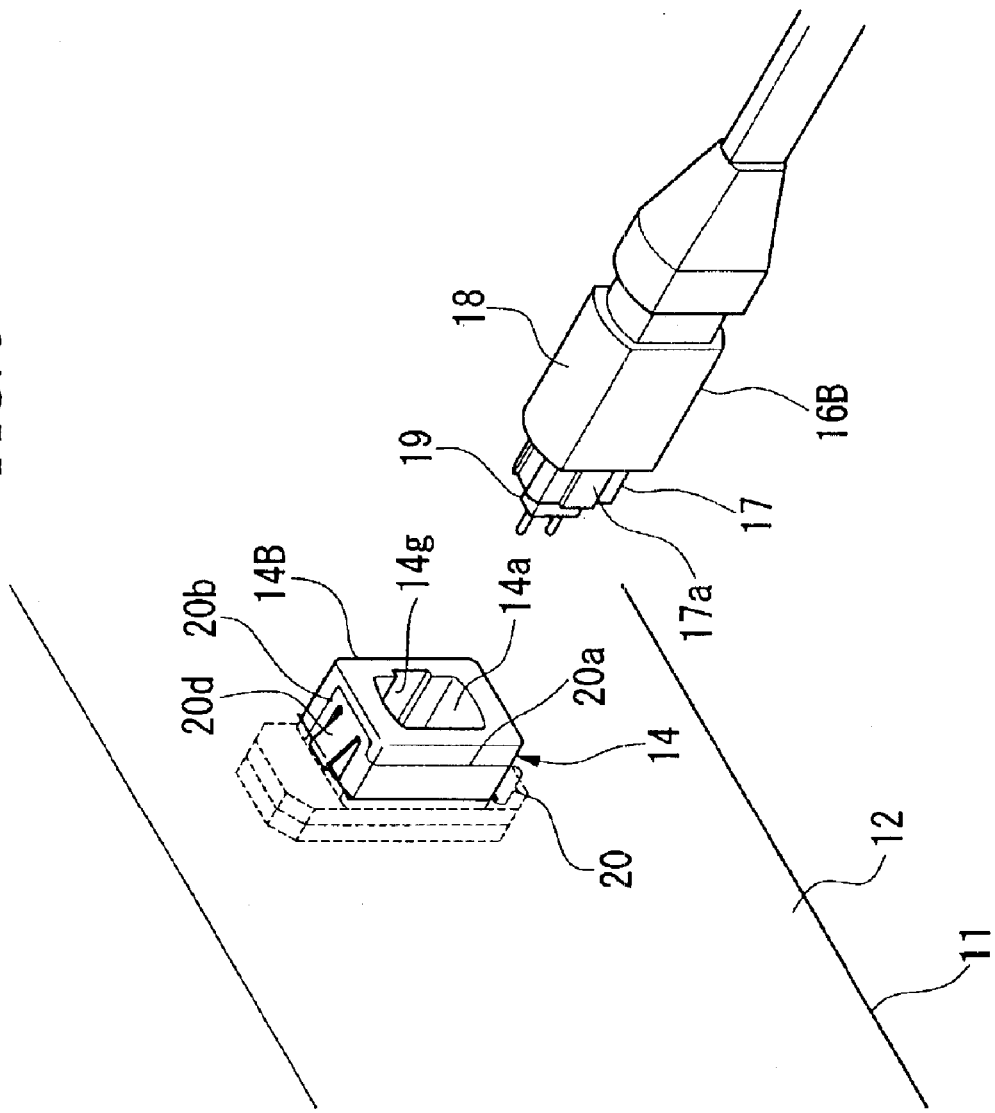
FIG. 5 is a perspective drawing viewing the installation state in FIG. 2 from inside the casing.
Figure 6:
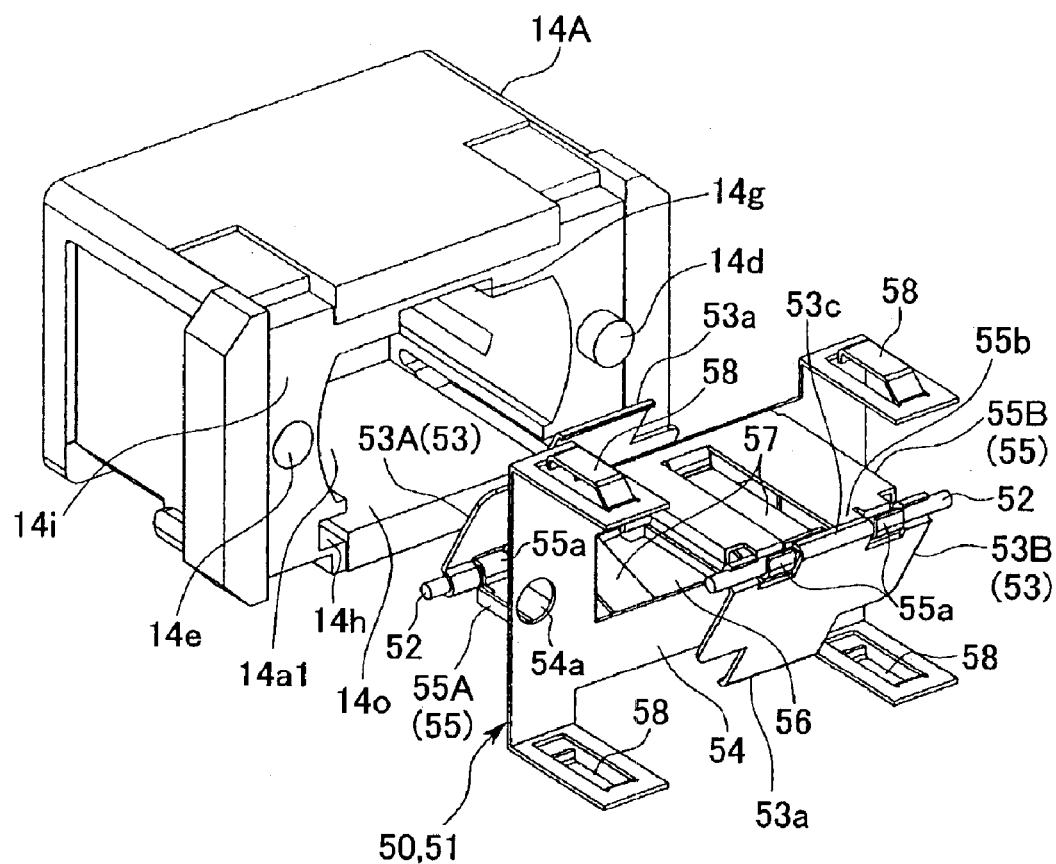
FIG. 6 is a perspective drawing showing the shutter unit of the optical connector with a shutter shown in FIG. 1A to FIG. 1D.
Figure 7:
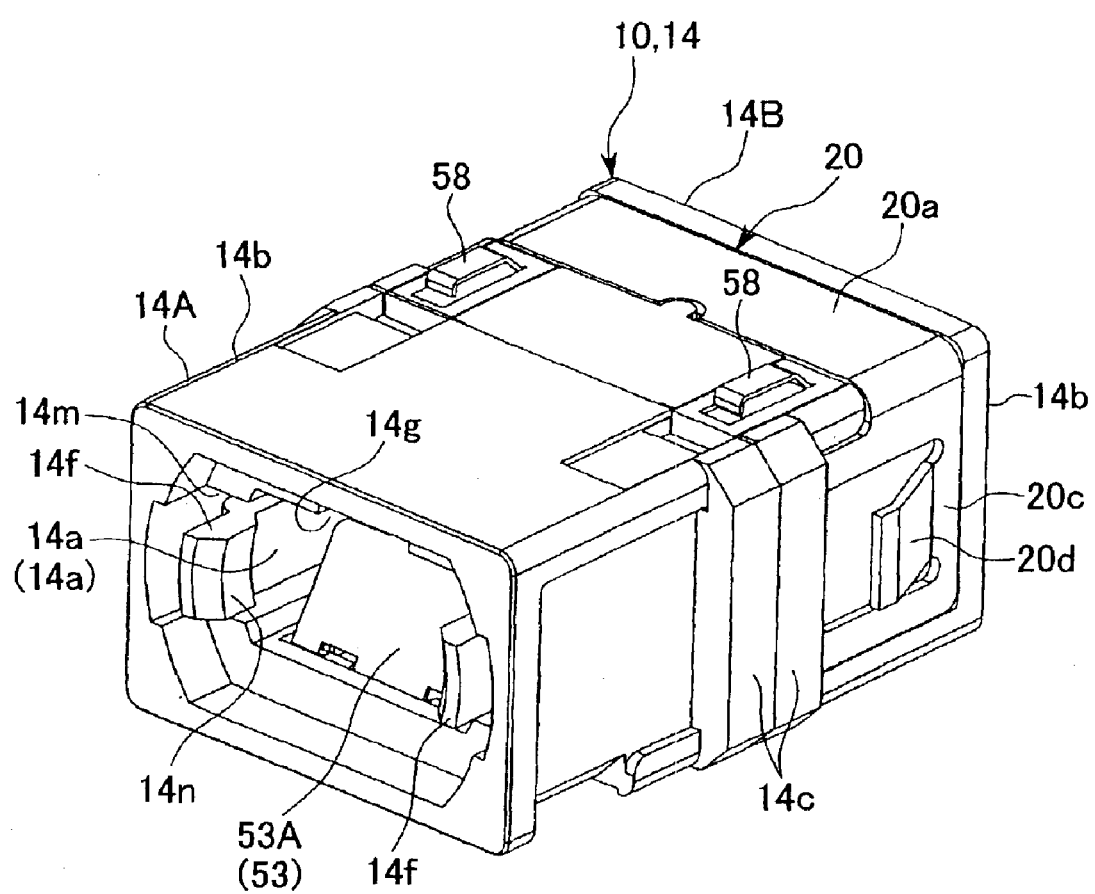
FIG. 7 is a perspective drawing showing the optical connector with a shutter shown in FIG. 1A to FIG. 1D.
Figure 8:
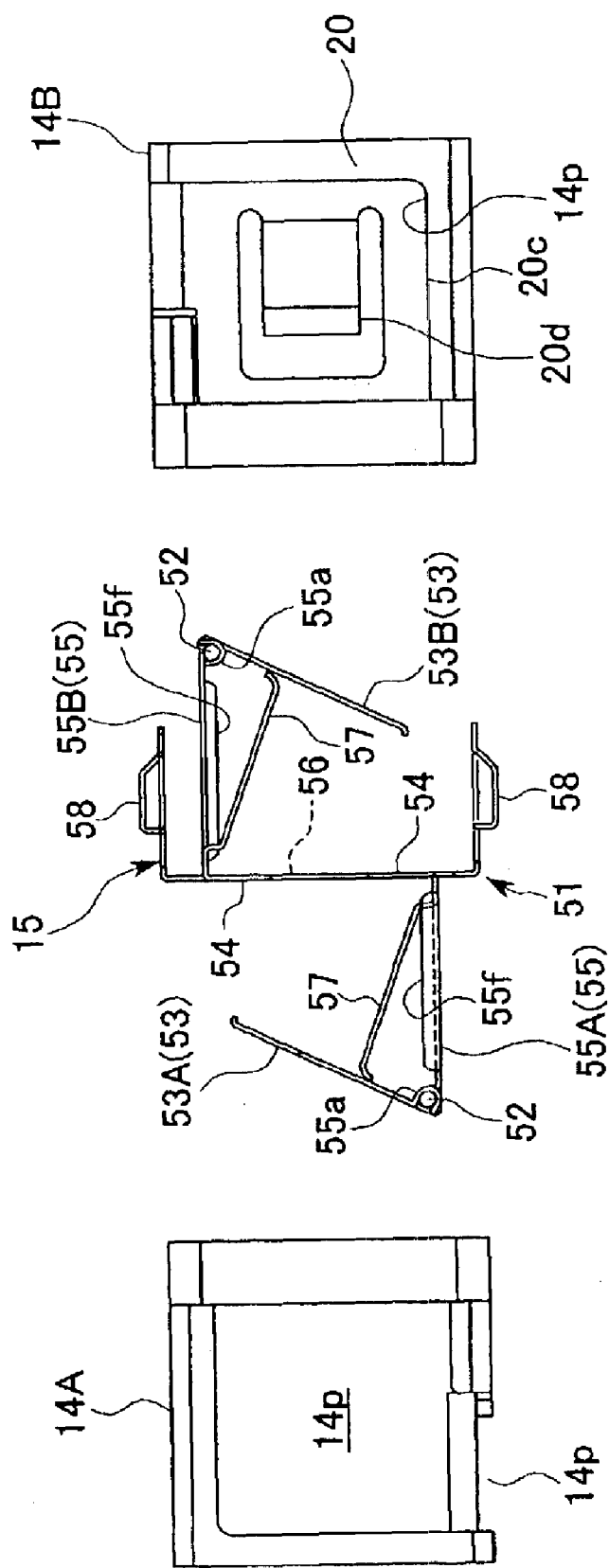
FIG. 8 is an exploded drawing showing the structure of the optical connector with a shutter shown in FIG. 1A to FIG. 1D.

The embodiments of the present invention will be explained in the following with reference to the figures. FIGS. 1A to 1D show the exterior of the optical connector 10 with a shutter in an embodiment of the present invention; FIG. 2 is a cross sectional drawing showing the installed state of the optical connector 10 with a shutter with respect to the installation wall 12 of the casing 11 of an instrument, and shows the vicinity of the connector installation hole 13 that has been opened in the installation wall 12; FIG. 3 is a perspective drawing viewing the installation state of the installation wall 12 of the optical connector 10 with a shutter shown in FIG. 2 from the outside of the casing 11; FIG. 4 is a perspective drawing showing the connector installation hole 13 formed in the installation wall 12; FIG. 5 is a perspective drawing viewing the installation state of the installation wall 12 of the optical connector 10 with a shutter shown in FIG. 2 from inside the casing 11; FIG. 6 is a perspective drawing showing the structure of the shutter unit of the optical connector 10 with a shutter; FIG. 7 is a perspective drawing showing the optical connector with a shutter (where the shutter unit 15 is assembled inside the connector housing 14) according to the present invention; FIG. 8 is an exploded drawing showing the structure of the optical connector 10 with a shutter.

As shown in FIG. 8, the optical connector 10 with a shutter described above has a structure wherein the shutter unit 15 is assembled inside the connector housing that forms the optical connector adaptor.

In FIG. 1A to FIG. 1D, the connector housing 14 is an optical connector adaptor of an MPO type optical connector (MPO: Multifiber Push-On; for example, JIS C 5982 or IEC 1754-7). The connector housing 14 is made from a synthetic resin such as plastic, is formed in a sleeve shape, and has a connector hole 14a that passes through the interior. This connector housing 14 is assembled by joining and integrating a pair of housing halves 14A and 14B.

Figure 9A:
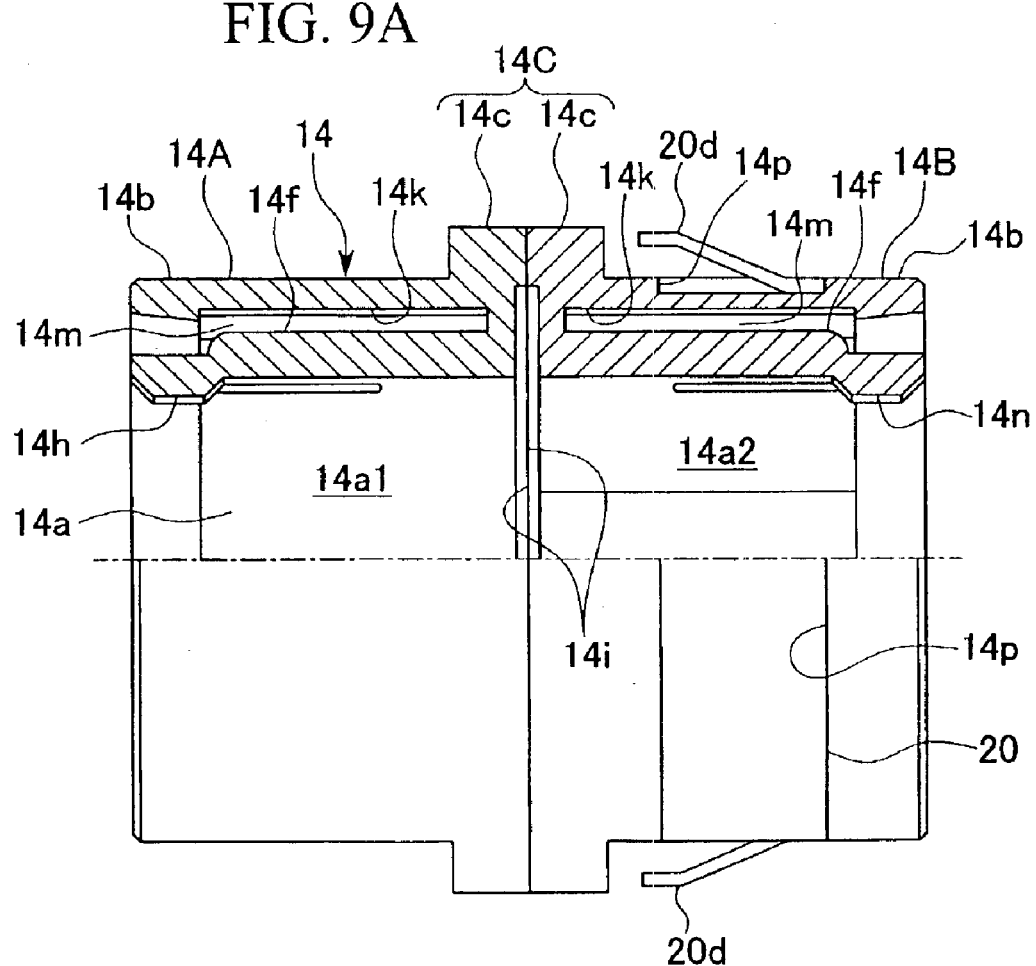
FIG. 9A is a cross-sectional drawing showing the connector housing of the optical connector with a shutter shown in FIG. 1A to FIG. 1D.
Figure 9B:
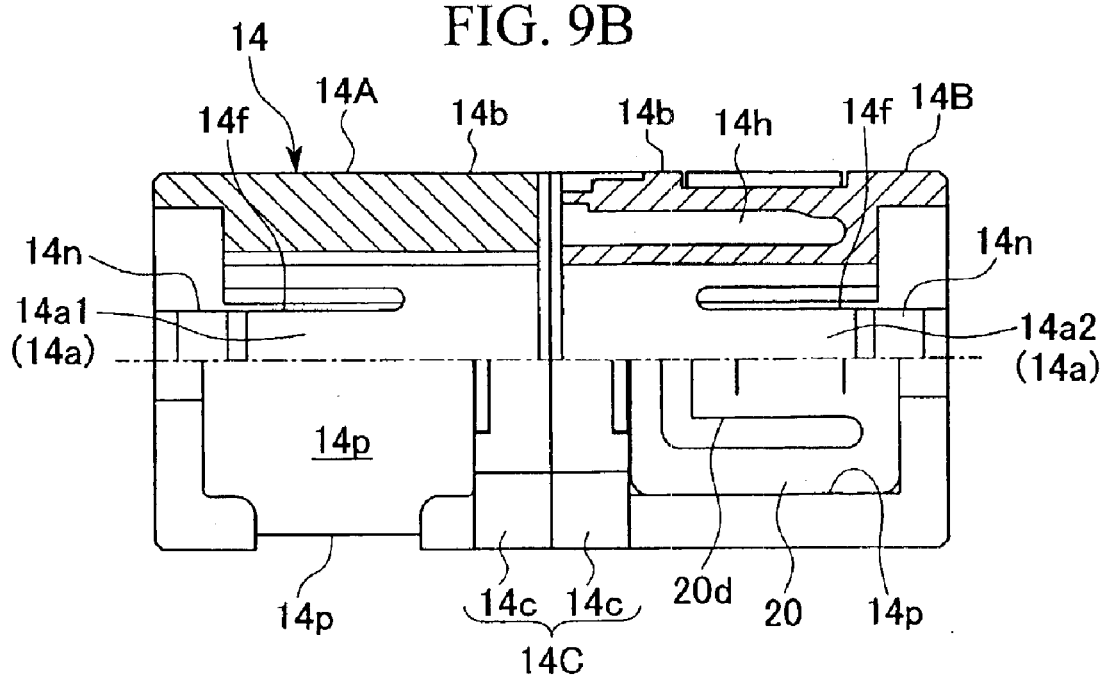
FIG. 9B is a cross-sectional drawing showing the connector housing of the optical connector with a shutter shown in FIG. 1A to FIG. 1D.

As shown in FIG. 9, each of the housing halves 14A and 14B is a single piece formed by a synthetic resin such as plastic, and has a sleeve-shaped housing body 14b and projecting pieces 14c that project in the axial direction on opposite sides from one end of this housing body 14b. In addition, the connector housing 14 is assembled by joining and integrating in a straight line in the axial direction the pair of housing halves 14A and 14B. FIG. 9 shows the state in which the housing halves 14A and 14B are joined together directly, without incorporating the shutter unit 15.

The pair of housing halves 14A and 14B are integrated by joining together the end parts of the side that forms the projecting pieces 14c (the end part on one housing body 14b in the axial direction; below referred to as the end of the joint end surface side in the axial direction), and thereby a connector housing 14 is assembled in which the projecting piece 14C, formed by placing together in alignment the projection pieces 14c of each of the housing halves 14A and 14B, projects in the axial direction (the axial direction of the connector hole 14a) on both sides facing the center.

In addition, as shown in FIG. 6, the pair of housing halves 14A and 14B are integrated by positioning the connector holes so as to communicate by engaging the engaging hole 14e and the engaging projection 14d, which is formed on the end surface (joining end surface 14i) of the side on which the projecting piece 14c is formed. Here, the pair of housing halves 14A and 14B have the same structure, and the engaging projection 14d that projects on the one housing half 14A and the engaging hole (not illustrated) formed in the other housing half 14B are engaged, and the engaging projection 14d (not illustrated) projecting on the other housing half 14B and the engaging hole 14e of the other housing half 14A are engaged. However, this is not limiting as a structure in which the housing halves 14A and 14B are positioned and then integrated and fastened, and various types of structure can be used. In addition, the housing halves 14A and 14B can be appropriately integrally fastened by using adhesive or the like.

In FIGS. 1C, 1D, 9A, and 9B, reference numeral 14f is an engaging catch (elastic catch) in the connector housing 14, and can be engaged with and released from an engaging part (engaging recess or the like; not illustrated) formed on the side of the sleeve-shaped housing 17 of the optical connectors 16A and 16B (see FIG. 3 and FIG. 5 (here, the optical connector plug stipulated by JIS C 5982 or IEC 1754-7); below the common structure of the optical connectors 16A and 16B may be explained using the reference numeral 16) that are inserted into and connected to the connector housing 14.

This engaging catch 14f is integrally formed on the housing bodies 14b of the housing halves 14A and 14B, and project from the inner surface 14k towards the connector holes (the connector hole on the housing half 14A is denoted by reference numeral 14a1 and the connector hole on the housing half 14B is denoted by reference numeral 14a2) inside the sleeve-shaped housing bodies 14b. The engaging catches 14f on each of the housing halves 14A and 14B have a shape extending along the inner surface of the housing body 14*b* from the end of the joining end surfaces 14*i* of the housing halves 14A and 14B in the axial direction towards the entrance side (in FIG. 9A and FIG. 9B, both the left and right side ends of the connector housing 14) opposite to the joining end surfaces 14*i* in the axial direction of the connector hole 14*a*. A slight clearance 14*m* is maintained between the part of the engaging catch 14*f* extending along the inner surface of the housing body 14*b* and the inner surface of the housing body 14*b*.

In addition, reference numeral 14*g* is a key groove that projects towards the side of the housing 17, and a key 17*a* is inserted therein.

In addition, the optical connector 16, which is an MPO type optical connector plug, and each of the housing halves 14A and 14B form a slide lock structure. In this slide lock structure, when the optical connector 16 is inserted into the connector housing (more specifically, the housing halves), the engaging projection 14*n* on the distal end of the engaging catch 14*f* projecting away from the housing body 14*b* of the housing half engages with the engaging part on the side of the housing 17 of the optical connector 16, and at the same time, the lock is secured so that the optical connector 16 cannot be extracted from the housing half, thereby preventing the release of the engagement. When the slide piece (coupling 18) attached to the optical connector 16 is pulled, the lock is released, and at the same time it is possible to remove the optical connector 16 from the connector housing 14 (housing halves).

Moreover, the engaging catch 14*f* can be appropriately altered depending on the type of the optical connector 16, the size of the housing 17, the shape of the engaging part, and the like. In addition, the illustration of the engaging catch 14*f* is omitted in FIG. 2, FIG. 3, and FIG. 5.

In addition, the connector housing, as described above, is not limited to a structure in which the engaging catch that engages the optical connector (optical connector plug) is integrally formed with the housing body of each housing half. For example, a structure is also possible wherein the sleeve-shaped housing body of a housing half accommodates a separate sleeve-shaped inner housing, and the engaging catch is formed on this inner housing.

Figure 13:
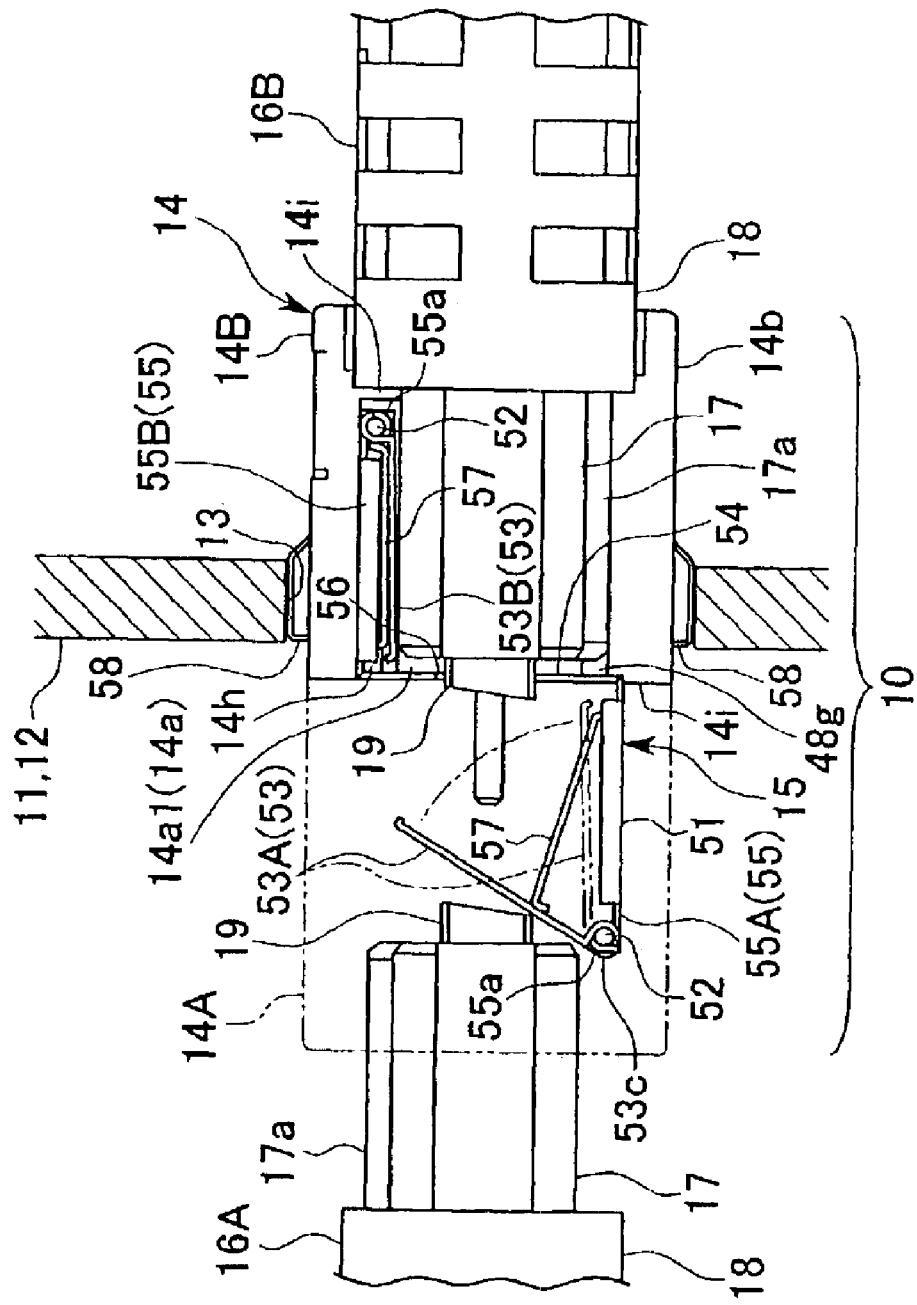
FIG. 13 is a perspective drawing showing the relationship between the distal end of the optical connector plug inserted into and connected to the optical connector adaptor and the window of the shutter unit.

As shown in FIG. 6, FIG. 8, and FIG. 13, the shutter unit 15 comprises a body 51 that is formed from a single metal plate by bending or the like and a pair of shutter pieces 53A and 53B that are attached to the body 51 by a hinge 52 so as to be able to freely rotate. In addition, in this embodiment, all members that form the shutter unit 15, that is, the body 51, the hinge 52, and the shutter pieces 53A and 53B, are formed by members that are electrically conducting, and they are connected so as to be able to conduct electricity. This embodiment illustrates one in which the body and the shutter pieces are formed by pressing an electrically conducting stainless steel plate.

Figure 10A:
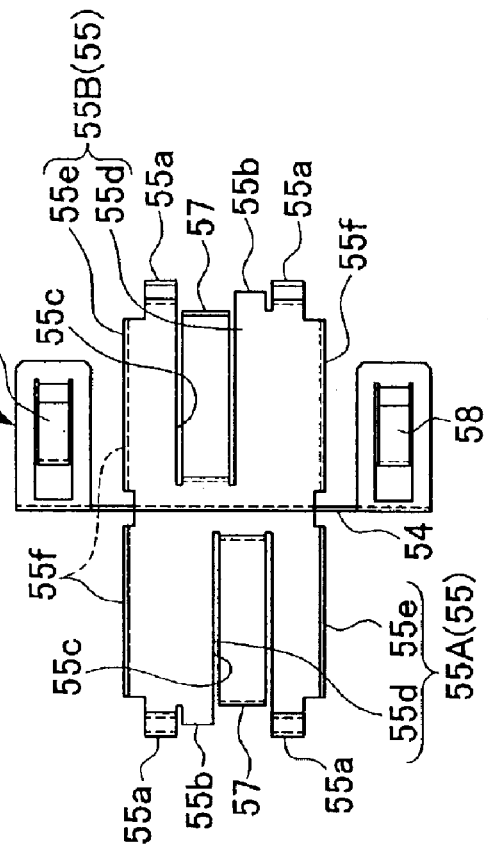
FIG. 10A is a planar drawing showing the body of the shutter unit of the optical connector with a shutter shown in FIG. 1A to FIG. 1D.
Figure 10B:
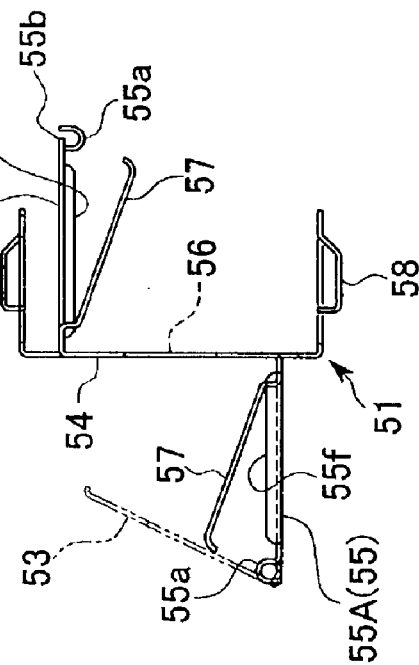
FIG. 10B is a side drawing viewed from the side of one overhanging part showing the body of the shutter unit of the optical connector with a shutter shown in FIG. 1A to FIG. 1D.
Figure 10C:
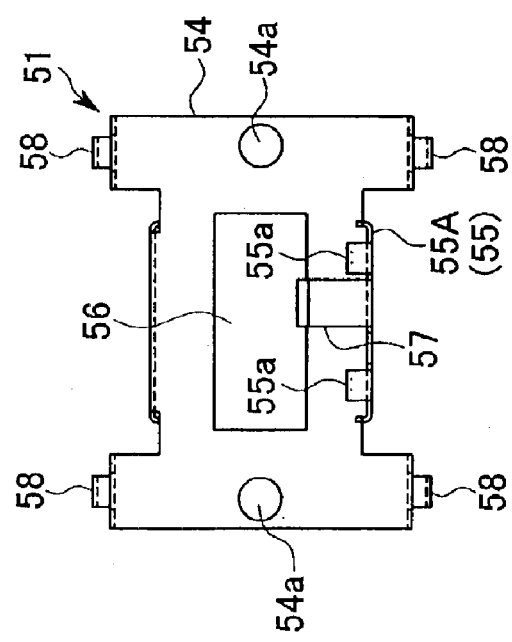
FIG. 10C is a frontal view showing the body of the shutter unit of the optical connector with a shutter shown in FIG. 1A to FIG. 1D.
Figure 11:
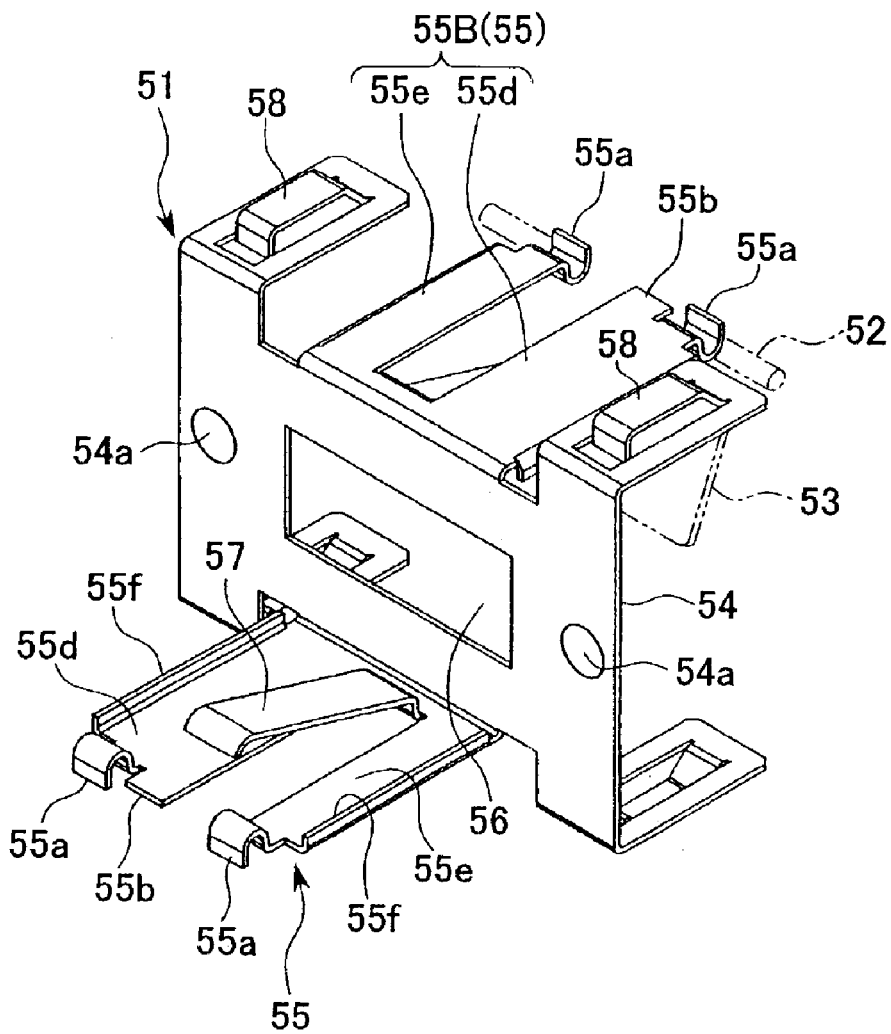
FIG. 11 is a perspective drawing showing the body of the shutter unit shown in FIG. 10A to FIG. 10D.

FIG. 10A to FIG. 10C show the structure of the body 51.

The body 51 comprises a plate-shaped fastening plate 54 that is fastened by being interposed between the pair of housing halves 14A and 14B and tongue-shaped overhanging parts 55A and 55B that overhang from both sides facing this fastening plate 43 so as to form a substantially right angle with respect to the fastening plate 54. However, the projection directions (overhanging direction) of the pair of overhanging parts 55A and 55B from the fastening plate 54 are exactly opposite with respect to the fastening plate 54. When the shutter unit 15 is assembled between the pair of housing halves 14A and 14B, the overhanging parts 55A and 55B are each inserted into the expanded part 14*o* (refer to FIG. 6), which is a part that expands the side facing the connector holes 14*a*1 and 14*a*2 of the housing halves 14A and 14B, or more specifically, the key grooves 14*g* of the connector holes 14*a*1 and 14*a*2, and has the function of positioning the body 51 at the target position in the connector housing 14. Moreover, the expanded part 14*o* forms a part of the positioning groove 14*h* explained below.

When the shutter unit 15 is assembled between the pair of housing halves 14A and 14B, the body 51 (more specifically, the fastening plate 54) is disposed exactly so as to cross the connector hole 14*a* in the axial direction at the center of the connector hole 14*a* of the connector housing 14 formed by the pair of housing halves 14A and 14B. However, the connector hole 14*a* passes through both sides of the body 51 (more specifically, the fastening plate 54) via the window 56 formed in the center of the fastening plate 54 of the body 51, and the fastening plate 54 of the body 51 is set so as not to hinder the connection between the optical connectors 16A and 16B that face the connector hole 14*a* and are inserted into and connected from both sides. In the optical connector 10 with a shutter, the housing 17 of the optical connectors 16A and 16B that is inserted into the connector hole 14*a* can be inserted into the window 56 of the body 51 of the shutter unit 15, and both ends (more specifically, both ferrules 19) of the optical connectors 16A and 16B that face the optical hole 14*a* and have been inserted from both sides are exactly abutted and connected in proximity to the fastening plate 54 of the body 51.

Moreover, in the body 51, from the point of view of guaranteeing the electromagnetic wave shielding capacity, it is more preferable that the window 56 be made as small as possible. In this embodiment, if at least a size that allows passage of the ferrule 19 at the distal end of each of the optical connectors 16A and 16B is guaranteed, there will be no hindrance of the connection between the optical connectors 16A and 16B.

In addition, this body 51 and the fastening plate 54 are formed at a size that substantially conforms to the cross-sectional shape of the housing body 14*b* of the housing halves 14A and 14B, and when the connector housing 14 of the optical connector 10 with a shutter is installed in the installation wall 12, it is disposed so as to block almost entirely the connector installation hole, and functions as a shielding plate that exhibits an electromagnetic wave shielding capacity.

As shown in FIG. 6, in the body 51, the engaging projection 41*d* formed on the joint end surface of the housing halves 14A and 14B serves as the positioning device for the body 51. It passes through the opened positioning hole 54*a* by passing through the fastening plate 54, and is engaged and fastened in the engaging hole 14*e* at the joint end surface of each of the partnering housing halves. Thereby, the body 51 is reliably positioned by the engaging projection 14*d*, and the fastened correctly and stably between the pair of housing halves 14A and 14B. Between the housing halves 14A and 14B, as a means for positioning and fastening stably the body 51 (more specifically, the fastening plate 54) with a tight fit, the engaging projection is not limiting. For example, any structure can be used in which the fastening plate 54 is interposed between positioning projections in a plurality of locations in proximity thereto.

Here, the hinge 52 is an axle installed at the distal end of the projection from the fastening plate 54 of the overhanging parts 55A and 55B, and when the shutter unit 15 is assembled between the pair of housing halves 14A and 14B, the hinge 52 is disposed substantially perpendicular to the axial direction of the connector hole 14a of the connector housing 14. Therefore, the shutter pieces 53A and 53B that are hinged on the body 51 by the hinge unit 52 so as to be able to rotate freely face the same axle, which is the hinge unit 52 (below, the hinge 52 is referred to as the axle 52), that is, they are supported so as to rotate freely around an axis of rotation that is substantially perpendicular to the connector hole 14a of the connector housing 14. This axle 52 is pressed inside the part (the axle support 55a) formed by bending the distal end of the overhanging parts 55A and 55B into a tube shape.

As shown in FIG. 6, both ends of the axle 52 project towards both sides of the overhanging parts 55A and 55B, and to accommodate the overhanging parts 55A and 55B inside the housing halves 14A and 14B, the overhanging parts 55A and 55B are pressed into a positioning groove 14h having a shape that expands one side (here, the side facing the key groove 14g) of the connector hole (reference numeral 14a1 denotes the connector hole of one of the one housing half 14A) of the housing halves 14A and 14B, and thereby functions to support the body 51 stably so as have a tight fit in the housing halves 14A and 14B. This can be explained in detail as follows. The positioning groove 14h is widened to a shape such that a part of the housing halves 14A and 14B on the connector hole side substantially conforms to the outer shape of the axle 52, and has a shape that is indented substantially parallel to the axial direction of this connector hole from the joint end surface 14i of the housing halves 14A and 14B. As a result, in the positioning grooves 14h, the part into which both ends of the axles 52 are inserted, serves as guide grooves cut into both sides of the wall facing the connector hole in the housing halves 14A and 14B. Parts other than the grooves cut into the walls on both sides of the housing halves 14A and 14B communicate with the connector hole. The axle 52 is inserted into both ends of the narrow positioning grooves 14h whose ends that project at both the overhanging parts 55A and 55B each substantially conforms to the outer shape of the axle 52, and thereby is accommodated in the housing halves 14A and 14B. As a result, the entire body 51 and shutter unit 15 are stably supported with a tight fit.

In addition, when the assembly of the shutter unit 15 into the connector housing 14 has been completed, the axle 52 at the distal ends of both overhanging parts 55A and 55B of the body 51 of the shutter unit 15 are supported so as to be interposed from both sides by the wall 14j that covers the innermost part (the innermost side when viewed from the joint end surface 14i) of the positioning grooves 14h of each of the housing halves 14A and 14B, and are stably accommodated in the connector housing 14 with a tight fit.

Moreover, because the overhanging parts 55A and 55B only differ in the direction of their projection from the fastening plate 54, below, in the case that the common structures of the overhanging parts 55A and 55B are discussed, they are denoted in the explanation by the reference numeral 55.

The positioning grooves 14h comprise a part for accommodating each of the overhanging parts 55 of the shutter unit (the expanded part 14o) and the part into which the projecting part from the overhanging part 55 of the axle 52 is pressed. The position of the key grooves 14g of the housing halves 14A and 14B is on relatively opposite sides between the housing halves 14A and 14B, but in the shutter unit 15, the communication positions (here, the position of the axles 52) of each of the shutter pieces 53A and 53B that are disposed facing each other on both sides of the body 51 face both sides of the body 51, and on both sides (that is, both sides of the axis that passes through the window 56 of the body 51) of the central axis of the connector whole 14a of the connector housing 14. Each of the overhanging parts 55 of the shutter unit 15 are pressed into and accommodated in the expanded part 14o of each of the housing halves 14A and 14B inside the positioning groove 14h. In addition, the part of the axle 52 that projects on both sides of the overhanging parts 55 extends into the positioning groove 14h from both sides of the expanded part 14o of each of the housing halves 14A and 14B, and is accommodated in the groove part of the positioning grooves 14h that have been cut into the walls on both sides of the housing halves 14A and 14B.

Even when the optical connector 10 with this shutter is assembled by incorporating the shutter 15 into the connector housing 14, in comparison to an optical connector adaptor in which the shutter unit 15 is not incorporated, the size of the optical connector 10 is not enlarged and the external size is the same as the optical connector adaptor in which the shutter unit 15 is not incorporated.

The shutter pieces 53A and 53B are small tongue-shaped plates that project from the body 51 of the shutter unit 15 to the connector hole 14a. Moreover, these shutter pieces 53A and 53B only differ in their installation direction with respect to the body 51 of the shutter unit 15, and otherwise the other particular structures are identical. Therefore, below, when the common structures of these shutter pieces 53A and 53B are discussed, they are denoted by reference numeral 53 in the explanation.

The shutter pieces 53 are formed concretely as convexities, and the projection 53a at the distal end of the "convexity" is positioned at the side furthest from the axle 52, while the part positioned at the base of the convexity is hinged at the axle 52. When the shutter unit 15 is incorporated between the pair of housing halves 14A and 14B, the projection 53a becomes inserted exactly into the key groove 14g of each of the housing halves 14A and 14B. Here, each of the shutter pieces 53A and 53B are provided so as to project from the communication position (the axle 52) with the body 51 into the connector hole 14a, and when the shutter pieces 53A and 53B are in the shielding position (explained below), the projection 53a enters the key groove 14g. When the shutter pieces 53A and 53B are pressed by the optical connector 15 that is pushed into the connector hole 14a, they are pressed down to reach the accommodation position (explained below). At this time, the projection 53a slips out of the key groove 14g. When the optical connector 16 is pulled out of the connector hole 14a and the shutter pieces 53A and 53B are restored to the shielding positions, the projection 53a again enters the key groove 14g.

Figure 12:
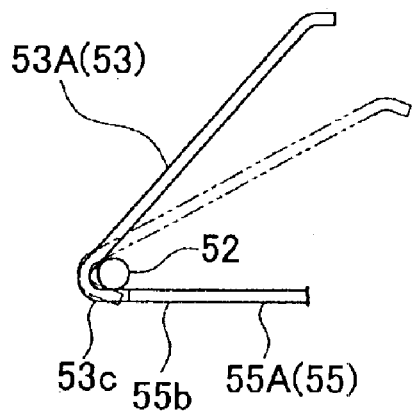
FIG. 12 is an expanded drawing showing the relationship between the stopper abutment part of the shutter piece shown in FIG. 10A to FIG. 10D and the stopper at the distal end of the overhanging part.

Each of the shutter pieces 53 comprises an axle holding part 53b, which is produced by bending the area at the end of the axle 52 side into at tube shape and accommodates the axle 52, and a stopper abutment part 53c, where the area at the end of the axle 52 side is formed into a curved shape. As shown in FIG. 13, the shutter pieces 53 rotate centered on the axle 52, and thereby they can switch between the position where they are slightly inclined from the axle 52 towards the fastening plate 54 side (in FIG. 8, the position of the shutter pieces 53A and 53B indicated by the solid line, and in FIG. 13, the position of the shutter piece 53A indicated by the solid line; this position is referred to below as the "shielding position") and the position at which they substantially overlap the overhanging parts 55A and 55B (in FIG. 13 the position of the shutter piece 53A indicated by the broken line and in the same figure the position of the shutter piece 53; below this position is referred to as the "accommodation position"). However, as shown in FIG. 12, at the shielding position (the position indicated by the solid line in FIG. 12), the stopper abutment parts 53c of the shutter pieces 53 abut the distal end of the overhanging parts 55, and thereby the opposite side of the fastening plate 54, that is, the shutter piece 53A, is restricted so that its rotation cannot exceed this position in the counter-clockwise position in FIG. 12. This is similarly the case for the shutter piece 53B (the shutter piece 53B is restricted such that its rotation towards the counter-clockwise direction is from the shielding position indicated by the solid line in FIG. 8). The projecting distal end that projects from the fastening plate 54 of the overhanging part 55 functions as a stopper 55b that restricts the rotation of the shutter pieces 53 from the shielding position towards the opposite side of the fastening plate 54.

Moreover, because the shutter pieces 53 in the shielding position block almost the entire connector hole 14a, in this state, for example, as shown in FIG. 13, it is possible to stop the emitted light from the optical fiber (refer to reference numeral 19a in FIG. 1A and FIG. 1D), exposed at the distal end of the connector 16B inserted and connected in advance from the opening of the shutter piece side, from being emitted from the opening on the opposite side of the connector hole 14a. In addition, at the shielding position, the projection 53a enters the key groove 14g of the connector hole 14a, the key groove 14g is also blocked, and thereby a superior capacity is obtained in terms of the electromagnetic wave shielding capacity.

In addition, the shutter pieces 53 positioned at the shielding position exhibit a dustproof capacity by stopping the penetration of dust and the like into the space located between the shutter pieces 53 and the connected optical connector 16B in the connector hole 14a, and thus drawbacks such as the distal end of the connected optical connector 16B becoming contaminated by the adhesion of dust or the like can be prevented.

Moreover, when neither of the optical connectors 16A or 16B are connected to the connector housing 14, if either one of the pair of shutter pieces 53 of the shutter unit 15 are in the shielding position, each of the shutter pieces 53 function as a dustproof shutter, and it is possible to prevent the penetration of dust and the like into the space between the pair of shutter pieces inside the connector hole 14a, and thereby preserve the cleanliness of this space.

As shown in FIG. 6, FIG. 8, and FIG. 13, in this shutter unit 15, as an urging device 57 for the shutter pieces 53, a part of the overhanging part 55 is formed so as to rise at an angle, and from the fastening plate 54 side, a plate-shaped spring (below, the urging deice is referred to as the spring 57) is used that extends so as to abut the part separated from the hinge 52 of the shutter pieces 53. This spring 57 has the function of urging the shutter pieces 53 in the direction away from the fastening plate 54. The shutter pieces 53 at the shielding position are pressed towards the stopper abutting unit 53c by the urging force of the spring 57, and firmly supported.

In addition to the spring 57 described above, it is possible to use as an urging device any structure such as one in which a part of the shutter pieces 53 is processed into a flat spring, or one in which a spring that is used is a separate part from body 51.

Concretely, as shown in FIG. 10A to FIG. 10C and FIG. 11, the spring 57 is a part formed by making the center part of the overhanging part 55 in the axial direction rise at an angle, and at the center part in the transverse direction of the overhanging part 55, a groove-shaped long hole 55c is formed that corresponds to a part that has been cut out of the spring. The overhanging part 55 is shaped so that it is almost completely separated into the plates 55d and 55e on both sides by the long hole 55c. The stopper 55b is a part that is formed by shaping the distal end of the plate 55d, which is one of the plates on either side, into a projection shape by the long hole 55c.

Moreover, the overhanging parts 55 are difficult to deform by bending or the like due to the reinforcing lip 55f molded into a curve by raising both end parts of the overhanging parts 55 in the transverse direction.

According to the optical connector 10 with the shutter described above, in the case that connectors 16A and 16B are connected together in the connector hole 14a of the contact housing 14, even in the sequence wherein one optical connector is inserted and connected in the connector housing 14 after the other optical connector has been inserted into the connector housing 14 beforehand (the optical connector that is inserted beforehand is the connected optical connector), the emitted light (specifically, the emitted light from the optical fiber exposed at the distal end of the ferrule 19; below referred to as "emitted light from the distal end of the optical connector") from the distal end of the optical connector that has been inserted into the connector housing 14 beforehand is blocked by the shutter pieces 53 of the shutter unit 15, and emission from the connector hole 14a is prevented. Thereby, the inconvenience of the emitted light from the connected optical connector is eliminated during the insertion and connection operation of the optical connector that is subsequently inserted into the connector housing 14 because the connected optical connector has been connected, and the connection operation can be carried out efficiently.

In addition, in the optical connector 10 with this shutter, when the optical connector is inserted into the connector hole 14a, the shutter pieces 53 are pressed by this optical connector, and thereby the shutter pieces 53 are pressed down so as to decrease the amount of projection into this connector hole 14a, and it is possible to push in the optical connector. The shutter pieces 53 do not cause any kind of hindrance to the insertion of the optical connector. The optical connectors 16A and 16B that have been inserted from both sides of the connector hole 14a each press down the shutter pieces 53, they enter the area between the pair of shutter pieces 53A and 53B, and as a result, the connection operation can be carried out.

In addition, in the optical connector 10 with a shutter, when the optical connector is inserted into the connector hole 14a, the shutter pieces 53 are pushed by this optical connector, and thereby the shutter pieces 53 are pressed down so as to decrease the amount of projection into the connector hole 14a, and thus it is possible to press in the optical connectors. The optical pieces 53 do not interfere in any way with the insertion of the optical connectors. The optical connectors 16A and 16B that have been inserted into the connector holes 14a from both sides each press down the shutter pieces 53, are inserted in the area between the pair of shutter pieces 53A and 53B, and as a result, it is possible to carry out the connection operation.

In addition, when the optical connectors are extracted from the connector holes 14a, the shutter pieces 53 are restored to the position that allows blocking of the emitted light by the urging force of the urging device 57.

We note that the distal end projecting from the body 51 (more specifically, the overhanging parts 55) abuts at a position most offset on the axis of rotation side from the distal end most distant from the axis of rotation (here, the distal end of the projection of the projection 53a) due to the hinge 52 of the shutter pieces 53. Concretely, it abuts at the substantial center of the shutter pieces 53. When the optical connectors inserted into the connector holes 14a presses down the shutter pieces 53, the spring 57 is pressed down in the direction of the axle 53 along the surface of the side that faces the fastening plate 54 of the shutter pieces 53, and accompanying this, the shutter pieces 53 also are pressed down so as to overlap the spring 57 (the accommodation position). In addition, when the optical connector that has been inserted into the connector hole 14a and presses the shutter pieces 53 into the accommodation position is extracted from the connector hole 14a, the shutter pieces 53 in the accommodation position are restored to the original shielding position by being pushed back due to the elasticity of the spring 57.

At this time, the displacement of the spring 57 becomes smaller than the rotational displacement of the shutter pieces 53. Therefore, for example, the particular deterioration due to the fatigue or the like of the spring 57 can be largely decreased in comparison to the case in which a shutter piece 53 serves as a flat spring comprising a metal plate or the like that is continuous with the body 51 and the restoration of the shutter piece from the accommodation position to the shielding position is carried out due to the elasticity of a shutter piece itself, which is a flat spring, and thus there is the advantage that the long term durability can be obtained.

(Concerning the Electromagnetic Wave Locking of the Connector Installation Hole)

As shown in FIG. 6, in the shutter unit 15, the contact 58 for electrical conduction projects in proximity to the body (specifically, the fastening plate 54). As shown in FIG. 1 and FIG. 7, when the optical connector 10 with a shutter has been assembled, the connector 58 for conduction projects outside the connector housing 14. In this embodiment, the projection position of the connector 58 for conduction outside the connector housing 14 is in proximity to the joint between the pair of housing halves 14A and 14B, and as shown in FIG. 2, when the optical connector 10 with a shutter is pressed into the connector installation hole 13 of the installation wall 12 of the casing and is installed in the installation wall 12, the connector 58 for conduction exactly abuts the inside wall of the connector installation hole 13. As a connector 58 for conduction, a separate member that connects separately to the shutter unit 15 can be used, but here concretely the connector 58 for conduction is one in which an extended part of a metal plate that forms the body 51 of the shutter unit 15 and extends from the body 51 is processed into a spring-shaped small projection, and as a result, by being pressed into the connector installation hole 13, it can be reliably brought into contact with the inside surface of the connector installation hole 13 due to the urging force.

Here, the casing (including the installation wall 12) has an electromagnetic wave shielding capacity, and as the material therefore, it is possible to use, for example, one in which the casing 11 is formed from an electrically conducting metal plate, such as stainless steel, one in which an electrically conducting layer is provided by using an electrically conducting coating, an adhesive film, or the like (in this case, the material forming the body is not limited) formed by applying an electrically conducting coating (for example, a paste having mixed therein a magnetic metal particles having an electromagnetic wave absorbing function) to the substrate of a base, or one in which an electrically conducting cloth comprising an electrically conducting fibers (metal fibers or the like) is fastened to the base. In addition, the shutter unit 15 is connected with the casing 11 via the conducting contact 58 by making contact therewith so as to allow conduction, and due to the casing 11 functioning as a ground, the electromagnetic wave shielding capacity of the contact installation hole 13 can be advantageously guaranteed by the shutter unit 15.

Figure 20:
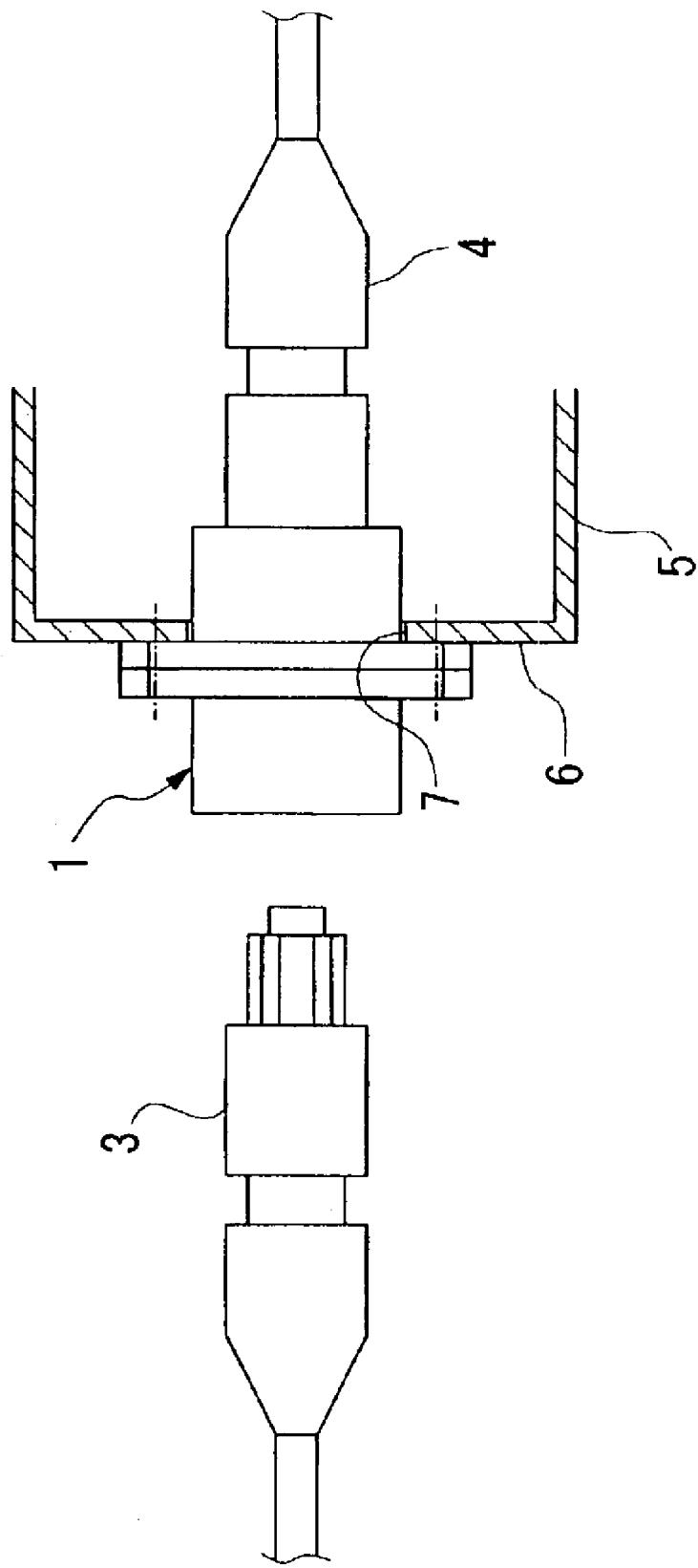
FIG. 20 is a cross sectional drawing showing the vicinity of the connector installation hole and showing the installed state of the optical connector adaptor with respect to the installation wall.

In addition, the shield cover denoted by reference numeral 20 in FIG. 2 comprises three side plates 20a, 20b, and 20c that are mounted separately on three surfaces of the four surfaces (peripheral surfaces) of the housing body 14b (refer to FIG. 1C) of the housing half 14B that have a rectangular cross-section. These are cover-shaped members that are formed entirely by an electrically conducting metal plate, such as stainless steel, and surround the housing half 14B on three sides. By being accommodated in a shallow groove 14p (refer to FIG. 8 and FIG. 9) formed on the three surfaces of the housing body 14b, the three side plates 20a, 20b, and 20c of this cover block 20 are mounted on the outside of the housing body 14b so that no positional displacement occurs As shown in FIG. 20, when the optical connector 10 with a shutter is inserted into the connector installation hole 13 in the installation wall 12, the engaging catch 20d, which projects to the outside from the side plates 20b and 20c positioned on both sides facing the shield cover 20, engages the installation wall around the connector installation hole 13 and functions to prevent the separation of the optical connector 10 with a shutter from the installation wall 12. At the same time, the optical connector 10 with a shutter is connected so as to allow electrical conduction due to its contact with the casing 11, and thereby exhibits the electromagnetic shielding capacity of the shield cover 20.

This engaging catch 20d is a part formed such that a part of the side plates 20b and 20c projects outward, extends from the side that is distant from the joint end surface 14i of the housing half 14B to the joint end surface 41i side, and is formed so that the amount of projection towards the outside of the housing half 14B gradually increases.

Naturally, it is preferable that the connector housing 14 itself have an electromagnetic wave shielding capacity in order to guarantee the electromagnetic wave shielding capacity of the connector installation hole 13. For example, a connector housing 14 (or housing half) formed by a synthetic resin having fine particles such as carbon filler, which has an electromagnetic wave absorbing function, mixed into the molded resin can be used, but the material for the connector housing 14 is not limited thereto. For example, one having an electrically conducting coating formed by applying an electrically conducting coating (for example, a paste having mixed therein magnetic metal particles having an electromagnetic wave absorbing function) on a substrate comprising a synthetic resin or the like, or one having an electrically conducting cloth comprising an electrically conducting fiber (metal fiber or the like) attached can be used.

To install this optical connector 10 with a shutter on the installation wall 12, it is inserted (in FIG. 2, pushed towards the right side of the installation wall 12) from the outside of the casing 11 (in FIG. 2, the left side of the installation wall 12) into the connector installation hole 13 of the installation wall 12, where the side in which the shield cover 20 is installed (here, the side of the housing half 14B) is in front. The connector installation hole 13 is molded into a shape that conforms to the external shape of the mounting portion of the shield cover 20, and as the optical connector 10 with a shutter is pushed into the connector installation hole 13, the engaging catch 20d of the shield cover 20 is elastically deformed by abutting with the inner wall surface of the connector installation hole 13, and pushed to the connector housing 14 side. Next, after having passed though the installation wall 12, it is restored to its original projection shape by its own elasticity, and engaged in the installation wall 12 from the inside of the casing 11. Thereby, the installation wall 12 becomes interposed between the optical connector 10 with a shutter and the projection 14c, and the optical connector 10 with a shutter is stably installed on the installation wall 12. At this time, because the separation of the optical connector 10 with a shutter from the installation wall 12 is impossible as long as the engagement of the engaging catch 20d to the installation wall 12 has not been released, unnecessary extraction of the optical connector 10 with a shutter can be prevented.

In addition, in the casing 11 of this embodiment, the electrically conducting parts (ground conductors) are exposed at least at locations on the inner surface side of the installation wall 20d where the engaging catch 20d abuts. Therefore, when the engaging catch is engaged on the installation wall 20 of the casing 11, the conducting parts of the shutter unit 20 and the casing 11 are connected so as to allow electrical conduction, and thereby the grounding of the shutter unit is guaranteed.

When the optical connector 10 with a shutter is installed on the installation wall 12, the connector installation hole 13 of the installation wall 12 is covered almost without any gap by the optical connector 10 with a shutter. At this time, the body 51 (specifically, the fastening plate 54) of the shutter unit 15 is disposed in the vicinity of the connector installation hole 13, then the window 56 of the body 51 (the window 56 of the fastening plate 54) is covered by the shutter pieces 53A and 53B, and as a result, due to the shutter unit 15 being disposed so as to cover substantially the entire connector installation hole 13, the connector installation hole 13 can be effectively blocked from electromagnetic waves.

Other Embodiments

Figure 14:
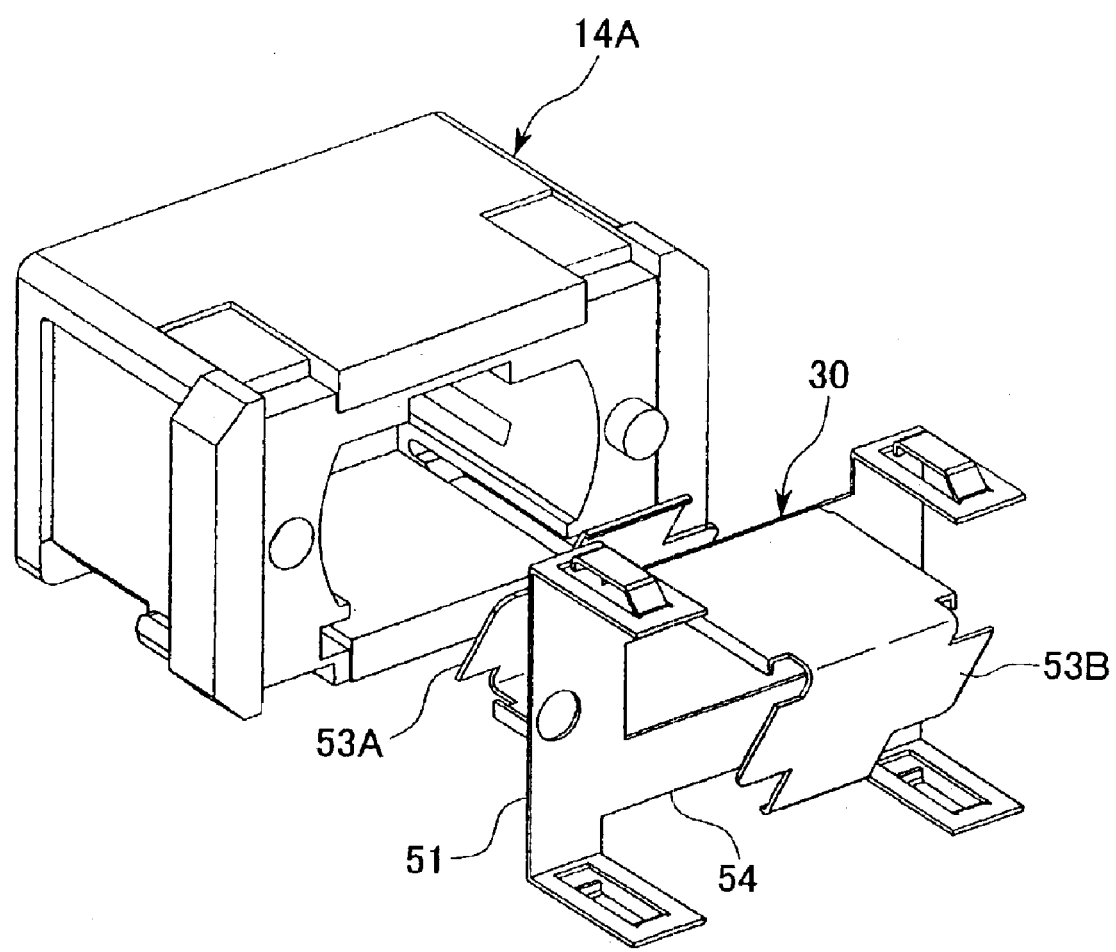
FIG. 14 is a perspective drawing showing the shutter unit, the entirety of which comprises one metal plate.
Figure 15:
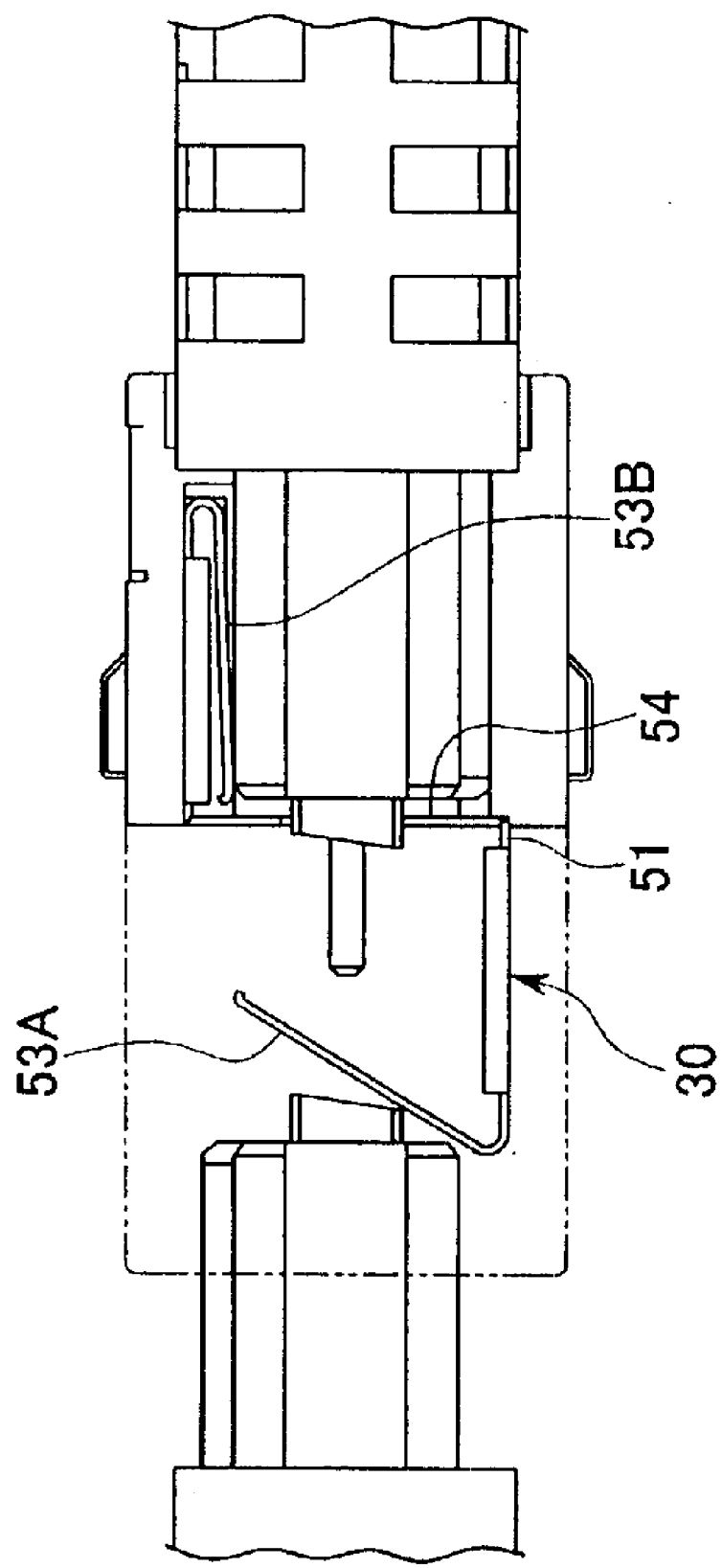
FIG. 15 is a cross-sectional drawing showing the state in which the shutter unit shown in FIG. 14 is incorporated into the connector housing.
Figure 18:
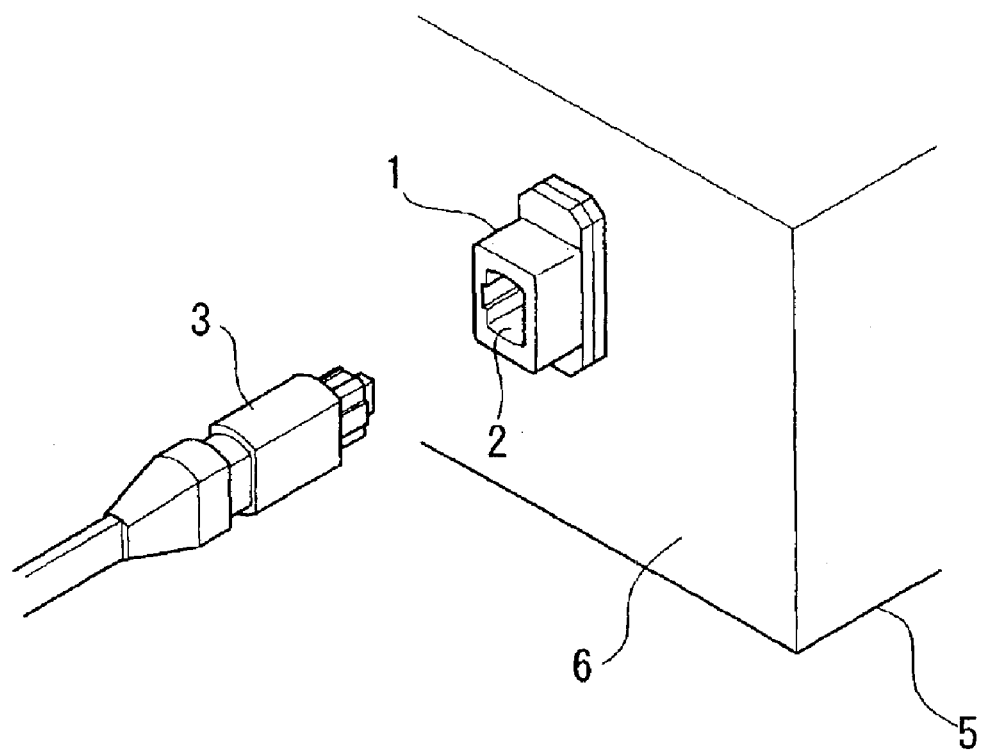
FIG. 18 is a perspective drawing showing the installed state of the optical connector adaptor with respect to an installation wall (panel) of an instrument.
Figure 19:
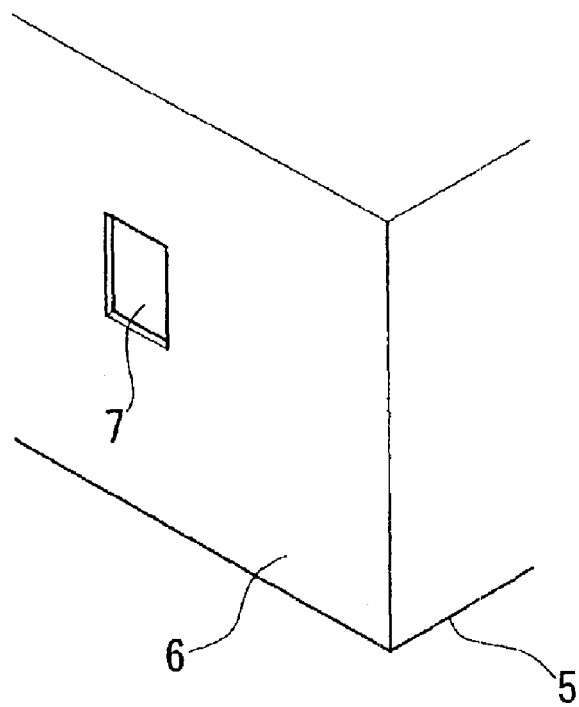
FIG. 19 is a perspective drawing showing the connector installation hole which is provided on the installation wall.

FIG. 14 and FIG. 15 show an example of an optical connector with a shutter that adapts a shutter unit 30 molded by processing one metal plate (stainless steel or the like). This shutter unit 30 is a single part that includes the body 51 (including the fastening plate 54) and the shutter pieces 53A and 53B using a single metal plate. When this structure is used, there are the advantages that the number of parts is small and it is possible to lower the cost. In addition, there is the advantage that the size can be reduced easily.

In this optical connector with a block, the shutter unit 30 that is incorporated inside the connector housing has shutter pieces 53A and 53B on both sides of the connector housing 14, and thus no matter which of the pair of optical connectors 16A or 16B connected inside the connector hole 14a by insertion from both sides facing the connector housing 14 is the connected optical connector, the effect of blocking light is similarly obtained.

In addition, in this optical connector with a shutter, the shutter unit 30 that is incorporated inside the connector housing has shutter pieces 53A and 53B on both sides of the connector housing 14, and thus no matter which of the pair of optical connectors 16A or 16B connected inside the connector hole 14a by insertion from both sides facing the connector housing 14 is the connected optical connector, the effect of blocking light is similarly obtained.

Moreover, the present invention is not limited by the embodiments described above, and several types of modifications are possible.

For example, the concrete shape of the shutter unit is not limited by the examples in the embodiment described above, and the design thereof can be appropriately modified.

In addition, in the embodiment described above, an example of the application to an optical connector adaptor for an MPO type optical connector used in connecting optical connector plugs together was used, but the invention is not limited thereby. It is possible to adapt the invention to optical connector adaptors other than MPO type optical connectors used to electrically connect optical connector plugs together. In addition, the invention is not limited to optical connector adaptors. For example, it is possible apply this to any type of optical connector having a connector hole into which an optical connector plug such as a connector receptacle is inserted and connected.

A structure for guaranteeing the grounding of the shutter unit is not limited to one in which the shutter unit is connected so as to allow electrical connection to the installation wall, which functions as a ground. For example, it is possible to use any structure, such as a connection with a ground wire separately provided. In addition, it is possible to use a structure in which the shutter unit is connected so as to allow electrical conduction to the installation wall that functions as a ground, or, like the embodiment described above, to use a structure in which a conducting contact provided on the shutter unit is connected so as to allow electrical connection by being brought into contact with the installation wall, or, like the shield cover illustrated in the embodiment described above, to use a structure in which the shutter unit is connected so as to allow electrical conduction to the installation wall via the shield cover connected so as to allow electrical conduction by being brought into contact with the installation wall.

The installation wall that is the object of installation of the optical connector with a shutter is not limited to a part of the casing of the device. For example, any type of structure such as a panel for mounting an optical connector, for example, an optical connector adaptor, on the frame for an optical wiring base can be used.

Any type of structure besides the axle described above can be used as the hinge that hinges the shutter pieces to the body.

In the embodiment described above, a shutter unit having a structure in which shutter pieces on both sides face each other was illustrated, but it is possible to use a structure in which having a shutter piece only on one side of the body.

In addition, in the embodiment described above, the case in which the present embodiment was applied to a multiple core optical connector was illustrated. However, the shutter structure of present invention can be applied to a single core optical connector by modifying each part of the component members. Here, a single core optical connector is not one having one hole for an optical connector ferrule (generally, called an MT optical connector), but is a standardized optical connector ferrule referred to as an SC type optical connector ferrule, or an LC or MU type having a narrow diameter. The operations for modifying these parts are obvious for a person skilled in the art.

What is claimed is:

1. An optical connector with a shutter,
    wherein a shutter unit that blocks emitted light emitted from said optical connector is built into a connector housing so that said optical connector and a connected optical connector are connected in a connector hole into which the optical connector and the connected optical connector are inserted and connected;
    said shutter unit comprises a body installed in proximity to the communication position between said optical connector and said connected optical connector in said connector hole and tongue-shaped shutter pieces that project into said connector hole from the body and are disposed so as to allow blocking of the emitted light from the optical fiber exposed at the distal end of said connected optical connector; and the connection of said optical connector to said connected optical connector is made possible as a result of said shutter pieces being pressed down so as to decrease the amount of projection into said connector hole due to said shutter pieces being pressed by said optical connector that has been inserted into said connector hole, and when said optical connector is extracted from said connector hole, said shutter pieces are restored to the positions that allow blocking of the emitted light by the elasticity of the shutter pieces themselves or the urging force of an urging device provided in said shutter unit; and wherein said connector housing is installed in a connector installation hole formed in an installation wall;

said connector housing is installed on the body of said shutter unit so as to cross over said connector hole, and when the connector housing is installed on said installation wall, a shielding plate, which is a conducting member, is formed that is disposed so as to cover the said connector installation hole almost completely; and a window that allows said optical connectors to pass through is formed on a part corresponding to said connector hole of said shielding plate, and when viewed from the opening of said connector hole, said shutter pieces are disposed so as to cover said window.

2. An optical connector with a shutter according to claim 1, wherein said shutter pieces are conducting members.

3. An optical connector with a shutter according to claim 1, wherein said connector housing comprises two housing halves divided in the axial direction at the center part of said connector hole, and said shutter unit is incorporated into said connector housing so that said shutter unit is supported by said two housing halves in proximity to the joint between said two housing halves.

4. An optical connector with a shutter according to claim 2, wherein said connector housing comprises two housing halves divided in the axial direction at the center part of said connector hole, and said shutter unit is incorporated into said connector housing so that said shutter unit is supported by said two housing halves in proximity to the joint between said two housing halves.

5. An optical connector with a shutter, wherein a shutter unit that blocks emitted light emitted from said optical connector is built into a connector housing so that said optical connector and a connected optical connector are connected in a connector hole into which the optical connector and the connected optical connector are inserted and connected;

said shutter unit comprises a body installed in proximity to the communication position between said optical connector and said connected optical connector in said connector hole and tongue-shaped shutter pieces that project into said connector hole from the body and are disposed so as to allow blocking of the emitted light from the optical fiber exposed at the distal end of said connected optical connector; and the connection of said optical connector to said connected optical connector is made possible as a result of said shutter pieces being pressed down so as to decrease the amount of projection into said connector bole due to said shutter pieces being pressed by said optical connector that has been inserted into said connector hole, and when said optical connector is extracted from said connector hole, said shutter pieces are restored to the positions that allow blocking of the emitted light by the elasticity of the shutter pieces themselves or the urging force of an urging device provided in said shutter unit; and wherein said shutter pieces of said shutter unit communicate so as to rotate freely with respect to the body by a hinge, centered on the axis of rotation substantially perpendicular to the axial direction of said connector hole;

said urging device is a plate or pin-shaped spring disposed so as to abut a position offset on said axis of rotation side further than the distal end that extends from the axis of rotation of said hinge parts of said shutter pieces; and said spring is elastically deformed by the rotation of said shutter pieces that are pressed by the optical connectors that have been inserted into said connector hole, and when said optical connectors are extracted from said connector hole, said shutter pieces are returned to the position that allows blocking the emitted light by an elastic restoration.

6. An optical connector with a shutter according to claim 1, wherein said shutter pieces of said shutter unit communicate so as to rotate freely with respect to said body by a hinge, centered on the axis of rotation substantially perpendicular to the axial direction of said connector hole;

said urging device is a plate or pin-shaped spring disposed so as to abut a position offset on said axis of rotation side further than the distal end that extends from the axis of rotation of said hinge parts of said shutter pieces; and said spring is elastically deformed by the rotation of said shutter pieces that are pressed by the optical connectors that have been inserted into said connector hole, and when said optical connectors are extracted from said connector hole, said shutter pieces are returned to the position that allows blocking the emitted light by an elastic restoration.

7. An optical connector with a shutter, wherein a shutter unit that blocks emitted light emitted from said optical connector is built into a connector housing so that said optical connector and a connected optical connector are connected in a connector hole into which the optical connector and the connected optical connector are inserted and connected;

said shutter unit comprises a body installed in proximity to the communication position between said optical connector and said connected optical connector in said connector hole and tongue-shaped shutter pieces that project into said connector hole from the body and are disposed so as to allow blocking of the emitted light from the optical fiber exposed at the distal end of said connected optical connector; and the connection of said optical connector to said connected optical connector is made possible as a result of said shutter pieces being pressed down so as to decrease the amount of projection into said connector hole due to said shutter pieces being pressed by said optical connector that has been inserted into the connector hole, and when said optical connector is extracted from said connector hole, said shutter pieces are restored to the positions that allow blocking of the emitted light by the elasticity of the shutter pieces themselves or the urging force of an urging device provided in said shutter unit;

wherein said shutter pieces are conducting members; and wherein said shutter pieces of said shutter unit communicate so as to rotate freely with respect to the body by a hinge, centered on the axis of rotation substantially perpendicular to the axial direction of said connector hole;

said urging device is a plate or pin-shaped spring disposed so as to abut a position offset on said axis of rotation side further than the distal end that extends from the axis of rotation of said hinge parts of said shutter pieces; and said spring is elastically deformed by the rotation of said shutter pieces that are pressed by the optical connectors that have been inserted into said connector hole, and when said optical connectors are extracted from said connector hole, said shutter pieces are returned to the position that allows blocking the emitted light by an elastic restoration.

8. An optical connector with a shutter according to claim 2, wherein said shutter pieces of said shutter unit communicate so as to rotate freely with respect to said body by a hinge, centered on the axis of rotation substantially perpendicular to the axial direction of said connector hole;

said urging device is a plate or pin-shaped spring disposed so as to abut a position offset on said axis of rotation side further than the distal end that extends from the axis of rotation of said hinge parts of said shutter pieces; and said spring is elastically deformed by the rotation of said shutter pieces that are pressed by the optical connectors that have been inserted into said connector hole, and when said optical connectors are extracted from said connector hole, said shutter pieces are returned to the position that allows blocking the emitted light by an elastic restoration.

9. An optical connector with a shutter, wherein a shutter unit that blocks emitted light emitted from said optical connector is built into a connector housing so that said optical connector and a connected optical connector are connected in a connector hole into which the optical connector and the connected optical connector are inserted and connected;

said shutter unit comprises a body installed in proximity to the communication position between said optical connector and said connected optical connector in said connector hole and tongue-shaped shutter pieces that project into said connector hole from the body and are disposed so as to allow blocking of the emitted light from the optical fiber exposed at the distal end of said connected optical connector; and the connection of said optical connector to said connected optical connector is made possible as a result of said shutter pieces being pressed down so as to decrease the amount of projection into said connector hole due to said shutter pieces being pressed by said optical connector that has been inserted into said connector hole, and when said optical connector is extracted from said connector hole, said shutter pieces are restored to the positions that allow blocking of the emitted light by the elasticity of the shutter pieces themselves or the urging force of an urging device provided in said shutter unit;

wherein said connector housing comprises two housing halves divided in the axial direction at the center part of said connector hole, and said shutter unit is incorporated into said connector housing so that said shutter unit is supported by said two housing halves in proximity to the joint between said two housing halves; and wherein said shutter pieces of said shutter unit communicate so as to rotate freely with respect to the body by a hinge, centered on the axis of rotation substantially perpendicular to the axial direction of said connector hole;

said urging device is a plate or pin-shaped spring disposed so as to abut a position offset on said axis of rotation side further than the distal end that extends from the axis of rotation of said hinge parts of said shutter pieces; and said spring is elastically deformed by the rotation of said shutter pieces that are pressed by the optical connectors that have been inserted into said connector hole, and when said optical connectors are extracted from said connector hole, said shutter pieces are returned to the position that allows blocking the emitted light by an elastic restoration.

10. An optical connector with a shutter according to claim 3, wherein said shutter pieces of said shutter unit communicate so as to rotate freely with respect to the body by a hinge, centered on the axis of rotation substantially perpendicular to the axial direction of said connector hole;

wherein said urging device is a plate or pin-shaped spring disposed so as to abut a position offset on said axis of rotation side further than the distal end that extends from the axis of rotation of said hinge parts of said shutter pieces; and wherein said spring is elastically deformed by the rotation of said shutter pieces that are pressed by the optical connectors that have been inserted into said connector hole, and when said optical connectors are extracted from said connector hole, said shutter pieces are returned to the position that allows blocking the emitted light by an elastic restoration.

11. An optical connector with a shutter, wherein a shutter unit that blocks emitted light emitted from said optical connector is built into a connector housing so that said optical connector and a connected optical connector are connected in a connector hole into which the optical connector and the connected optical connector are inserted and connected;

said shutter unit comprises a body installed in proximity to the communication position between said optical connector and said connected optical connector in said connector hole and tongue-shaped shutter pieces that project into said connector hole from the body and are disposed so as to allow blocking of the emitted light from the optical fiber exposed at the distal end of said connected optical connector; and the connection of said optical connector to said connected optical connector is made possible as a result of said shutter pieces being pressed down so as to decrease the amount of projection into said connector hole due to said shutter pieces being pressed by said optical connector that has been inserted into said connector hole, and when said optical connector is extracted from said connector hole, said shutter pieces are restored to the positions that allow blocking of the emitted light by the elasticity of the shutter pieces themselves or the urging force of an urging device provided in said shutter unit;

wherein said shutter pieces are conducting members;

wherein said connector housing comprises two housing halves divided in the axial direction at the center part of said connector hole, and said shutter unit is incorporated into said connector housing so that said shutter unit is supported by said two housing halves in proximity to the joint between said two housing halves; and wherein said shutter pieces of said shutter unit communicate so as to rotate freely with respect to said body by a hinge, centered on the axis of rotation substantially perpendicular to the axial direction of said connector hole;

said urging device is a plate or pin-shaped spring disposed so as to abut a position offset on said axis of rotation side further than the distal end that extends from the axis of rotation of said hinge parts of said shutter pieces; and said spring is elastically deformed by the rotation of said shutter pieces that are pressed by the optical connectors that have been inserted into said connector hole, and when said optical connectors are extracted from said connector hole, said shutter pieces are returned to the position that allows blocking the emitted light by an elastic restoration.

12. An optical connector with a shutter according to claim 4, wherein said shutter pieces of said shutter unit communicate so as to rotate freely with respect to the body by a hinge, centered on the axis of rotation substantially perpendicular to the axial direction of said connector hole;

said urging device is a plate or pin-shaped spring disposed so as to abut a position offset on said axis of rotation side further than the distal end that extends from the axis of rotation of said hinge parts of said shutter pieces; and said spring is elastically deformed by the rotation of said shutter pieces that are pressed by the optical connectors that have been inserted into said connector hole, and when said optical connectors are extracted from said connector hole, said shutter pieces are returned to the position that allows blocking the emitted light by an elastic restoration.

13. An optical connector with a shutter according to claim 1, wherein in said shutter unit, said shutter pieces are disposed facing each other on both sides on said body.

14. An optical connector with a shutter according to claim 2, wherein in said shutter unit, said shutter pieces are disposed facing each other on both sides on said body.

15. An optical connector with a shutter according to claim 3, wherein in said shutter unit, said shutter pieces are disposed facing each other on both sides on said body.

16. An optical connector with a shutter according to claim 4, wherein in said shutter unit, said shutter pieces are disposed facing each other on both sides on said body.

17. An optical connector with a shutter according to claim 5, wherein in said shutter unit, said shutter pieces are disposed facing each other on both sides on said body.

18. An optical connector with a shutter according to claim 6, wherein in said shutter unit, said shutter pieces are disposed facing each other on both sides on said body.

19. An optical connector with a shutter according to claim 7, wherein in said shutter unit, said shutter pieces are disposed facing each other on both sides on said body.

20. An optical connector with a shutter according to claim 8, wherein in said shutter unit, said shutter pieces are disposed facing each other on both sides on said body.

21. An optical connector with a shutter according to claim 9, wherein in said shutter unit, said shutter pieces are disposed facing each other on both sides on said body.

22. An optical connector with a shutter according to claim 10, wherein in said shutter unit, said shutter pieces are disposed facing each other on both sides on said body.

23. An optical connector with a shutter according to claim 11, wherein in said shutter unit, said shutter pieces are disposed facing each other on both sides on said body.

24. An optical connector with a shutter according to claim 12, wherein in said shutter unit, said shutter pieces are disposed facing each other on both sides on said body.

25. An optical connector with a shutter according to claim 13, wherein communication positions between said shutter pieces and said body face both sides of said body and are positioned so as to be on both sides of said connector hole of said connector housing on the center axis, and said shutter pieces are provided so as to project into each of said connector holes from the communication position with said body.

26. An optical connector with a shutter, wherein a shutter unit that blocks emitted light emitted from said optical connector is built into a connector housing so that said optical connector and a connected optical connector are connected in a connector hole into which the optical connector and the connected optical connector are inserted and connected;

said shutter unit comprises a body installed in proximity to the communication position between said optical connector and said connected optical connector in said connector hole and tongue-shaped shutter pieces that project into said connector hole from the body and are disposed so as to allow blocking of the emitted light from the optical fiber exposed at the distal end of said connected optical connector; and the connection of said optical connector to said connected optical connector is made possible as a result of said shutter pieces being pressed down so as to decrease the amount of projection into said connector hole due to said shutter pieces being pressed by said optical connector that has been inserted into said connector hole, and when said optical connector is extracted from said connector hole, said shutter pieces are restored to the positions that allow blocking of the emitted light by the elasticity of the shutter pieces themselves or the urging force of an urging device provided in said shutter unit;

wherein said shutter pieces are conducting members;

wherein in said shutter unit, said shutter pieces are disposed facing each other on both sides on the body; and wherein communication positions between said shutter pieces and the body face both sides of the body and are positioned so as to be on both sides of said connector hole of said connector housing on the center axis, and said shutter pieces are provided so as to project into each of said connector holes from the communication position with the body.

27. An optical connector with a shutter according to claim 14, wherein communication positions between said shutter pieces and the body face both sides of the body and are positioned so as to be on both sides of said connector hole of said connector housing on the center axis, and said shutter pieces are provided so as to project into each of said connector holes from the communication position with the body.

28. An optical connector with a shutter, wherein a shutter unit that blocks the emitted light emitted from said optical connector is built into a connector housing so that said optical connector and a connected optical connector are connected in a connector hole into which the optical connector and the connected optical connector are inserted and connected;

said shutter unit comprises a body installed in proximity to the communication position between said optical connector and said connected optical connector in said connector hole and tongue-shaped shutter pieces that project into said connector hole from the body and are disposed so as to allow blocking of the emitted light from the optical fiber exposed at the distal end of said connected optical connector; and the connection of said optical connector to said connected optical connector is made possible as a result of said shutter pieces being pressed down so as to decrease the amount of projection into said connector hole due to said shutter pieces being pressed by said optical connector that has been inserted into said connector hole, and when said optical connector is extracted from said connector hole, said shutter pieces are restored to the positions that allow blocking of the emitted light by the elasticity of the shutter pieces themselves or the urging force of an urging device provided in said shutter unit;

wherein said connector housing comprises two housing halves divided in the axial direction at the center part of said connector hole, and said shutter unit is incorporated into said connector housing so that said shutter unit is supported by said two housing halves in proximity to the joint between said two housing halves;

wherein in said shutter unit, said shutter pieces are disposed facing each other on both sides on the body; and wherein communication positions between said shutter pieces and said body face both sides of said body and are positioned so as to be on both sides of said connector hole of said connector housing on the center axis, and said shutter pieces are provided so as to project into each of said connector holes from the communication position with said body.

29. An optical connector with a shutter according to claim 15, wherein communication positions between said shutter pieces and said body face both sides of said body and are positioned so as to be on both sides of said connector hole of said connector housing on the center axis, and said shutter pieces are provided so as to project into each of said connector holes from the communication position with said body.

30. An optical connector with a shutter according to claim 16, wherein communication positions between said shutter pieces and the body face both sides of the body and are positioned so as to be on both sides of said connector hole of said connector housing on the center axis, and said shutter pieces are provided so as to project into each of said connector holes from the communication position with the body.

31. An optical connector with a shutter according to claim 17, wherein communication positions between said shutter pieces and the body face both sides of said body and are positioned so as to be on both sides of said connector hole of said connector housing on the center axis, and said shutter pieces are provided so as to project into each of said connector holes from the communication position with said body.

32. An optical connector with a shutter according to claim 18, wherein communication positions between said shutter pieces and the body face both sides of the body and are positioned so as to be on both sides of said connector hole of said connector housing on the center axis, and said shutter pieces are provided so as to project into each of said connector holes from the communication position with the body.

33. An optical connector with a shutter according to claim 19, wherein communication positions between said shutter pieces and the body face both sides of the body and are positioned so as to be on both sides of said connector hole of said connector housing on the center axis, and said shutter pieces are provided so as to project into each of said connector holes from the communication position with the body.

34. An optical connector with a shutter according to claim 20, wherein communication positions between said shutter pieces and the body face both sides of the body and are positioned so as to be on both sides of the connector hole of said connector housing on the center axis, and said shutter pieces are provided so as to project into each of said connector holes from the communication position with the body.

35. An optical connector with a shutter according to claim 21, wherein communication positions between said shutter pieces and the body face both sides of the body and are positioned so as to be on both sides of said connector hole of said connector housing on the center axis, and said shutter pieces are provided so as to project into each of said connector holes from the communication position with the body.

36. An optical connector with a shutter according to claim 22, wherein communication positions between said shutter pieces and the body face both sides of the body and are positioned so as to be on both sides of said connector hole of said connector housing on the center axis, and said shutter pieces are provided so as to project into each of said connector holes from the communication position with the body.

37. An optical connector with a shutter according to claim 23,
wherein communication positions between said shutter pieces and the body face both sides of the body and are positioned so as to be on both sides of said connector hole of said connector housing on the center axis, and said shutter pieces are provided so as to project into each of said connector holes from the communication position with the body.

38. An optical connector with a shutter according to claim 24,
wherein communication positions between said shutter pieces and the body face both sides of the body and are positioned so as to be on both sides of said connector hole of said connector housing on the center axis, and said shutter pieces are provided so as to project into each of said connector holes from the communication position with the body.

* * * * *

UNITED STATES PATENT AND TRADEMARK OFFICE
CERTIFICATE OF CORRECTION

PATENT NO. : 6,866,424 B2
DATED : June 28, 2005
INVENTOR(S) : Tanaka et al.

It is certified that error appears in the above-identified patent and that said Letters Patent is hereby corrected as shown below:

Column 20,
Line 2, "into said connector bole" should read -- into said connector hole --.

Signed and Sealed this

Sixteenth Day of August, 2005

JON W. DUDAS
*Director of the United States Patent and Trademark Office*